US012803075B2

(12) United States Patent
Chinen

(10) Patent No.: US 12,803,075 B2
(45) Date of Patent: Nov. 17, 2026

(54) BATTERY PACK

(71) Applicant: MURATA MANUFACTURING CO., LTD., Kyoto (JP)

(72) Inventor: Atsushi Chinen, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 670 days.

(21) Appl. No.: 18/236,707

(22) Filed: Aug. 22, 2023

(65) Prior Publication Data

US 2024/0194969 A1 Jun. 13, 2024

(30) Foreign Application Priority Data

Dec. 12, 2022 (JP) ............................ JP2022-198004

(51) Int. Cl.

| | |
|---|---|
| ***H01M 10/653*** | (2014.01) |
| ***H01M 10/613*** | (2014.01) |
| ***H01M 10/643*** | (2014.01) |
| ***H01M 10/6552*** | (2014.01) |
| ***H01M 10/6553*** | (2014.01) |
| ***H01M 50/213*** | (2021.01) |
| ***H01M 50/284*** | (2021.01) |
| ***H01M 50/296*** | (2021.01) |
| ***H01M 50/512*** | (2021.01) |

(52) U.S. Cl.

CPC ....... *H01M 10/653* (2015.04); *H01M 10/613* (2015.04); *H01M 10/643* (2015.04); *H01M 10/6552* (2015.04); *H01M 10/6553* (2015.04); *H01M 50/213* (2021.01); *H01M 50/284* (2021.01); *H01M 50/296* (2021.01); *H01M 50/512* (2021.01)

(58) Field of Classification Search

None

See application file for complete search history.

(56) References Cited

U.S. PATENT DOCUMENTS

| | | | | |
|---|---|---|---|---|
| 2017/0352935 | A1* | 12/2017 | Perdu .................. | H01M 50/131 |
| 2022/0059883 | A1* | 2/2022 | Kuroda ............... | H01M 50/209 |
| 2022/0302561 | A1* | 9/2022 | Harris ................. | H01M 50/296 |

FOREIGN PATENT DOCUMENTS

| | | |
|---|---|---|
| JP | 2007257843 A | 10/2007 |

* cited by examiner

*Primary Examiner* — Jonathan Crepeau

(74) *Attorney, Agent, or Firm* — K&L Gates LLP

(57) ABSTRACT

A battery pack includes a first secondary battery and a second secondary battery each having a cylindrical shape and arranged in parallel, an external connection terminal detachably and electrically and thermally connected to an external device, and a heat transfer member electrically and thermally connecting the first secondary battery and the external connection terminal.

12 Claims, 19 Drawing Sheets

BATTERY PACK

CROSS REFERENCE TO RELATED APPLICATION

The present application claims priority to Japanese patent application no. 2022-198004, filed on Dec. 12, 2022, the entire contents of which is incorporated herein by reference.

BACKGROUND

The present disclosure relates to a battery pack.

A vehicle battery pack as an example of a battery pack is disclosed and includes a case and a plurality of battery cells housed in the case. Heat of the battery cell (secondary battery) is transferred to the case via a heat absorption unit, a heat pipe, and a cooling unit, and is released from the case to the outside.

SUMMARY

In recent years, an increase in power of a load device to which a battery pack is applied has progressed, and a calorific value of a secondary battery has increased. Therefore, further improvement of heat dissipation performance of the battery pack is required.

The present disclosure, in an embodiment, relates to improving heat dissipation performance in the battery pack.

A battery pack of the present disclosure, in an embodiment, includes a first secondary battery and a second secondary battery each having a cylindrical shape and arranged in parallel, an external connection terminal detachably electrically and thermally connected to an external device, and a heat transfer member electrically and thermally connecting the first secondary battery and the external connection terminal.

According to the present disclosure, heat dissipation performance can be improved in a battery pack.

DETAILED DESCRIPTION

Figure 1:
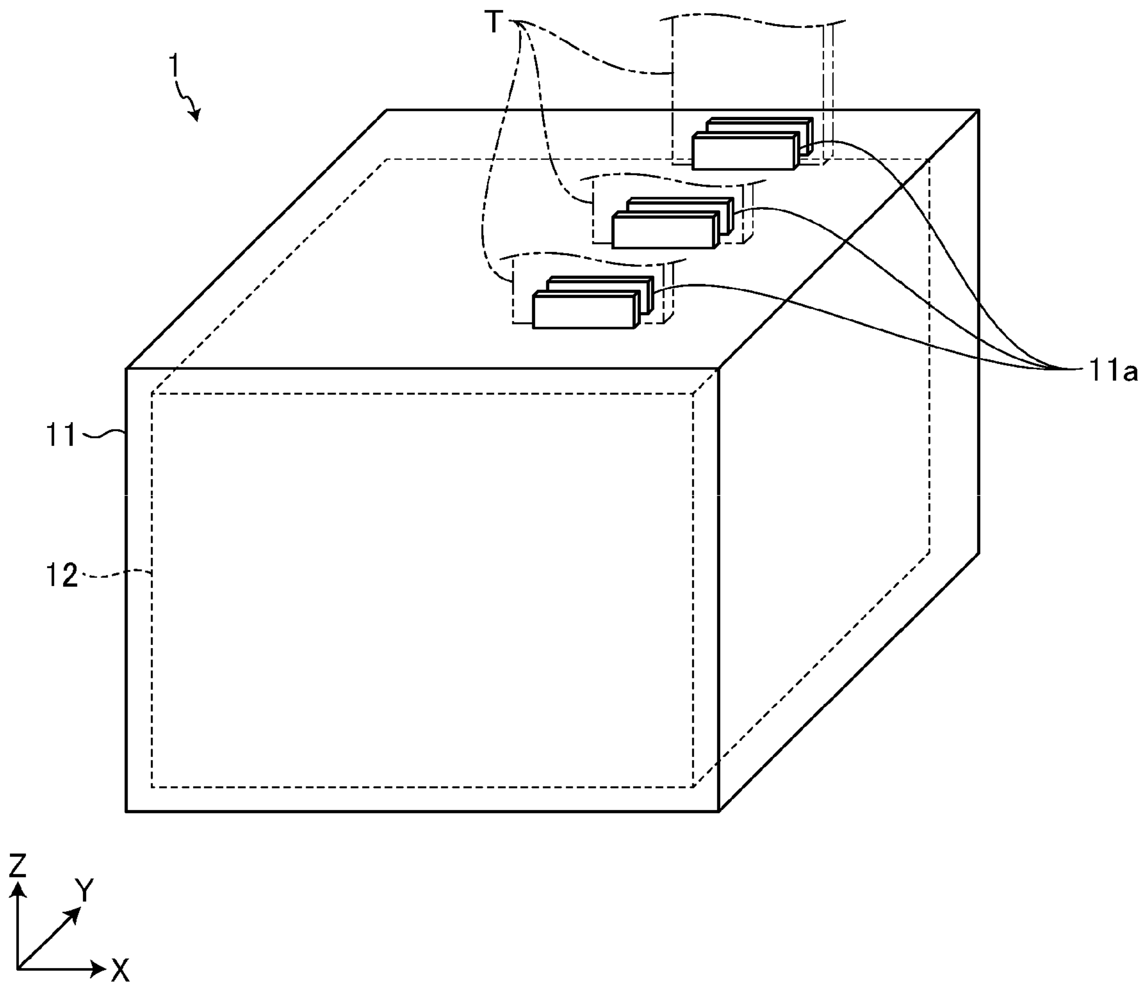
FIG. 1 is a perspective view of a battery pack according to an embodiment of the present disclosure.

Hereinafter, one or more embodiments will be described in further detail below with reference to the drawings. Note that the present disclosure is not limited thereto. The embodiments including modifications described herein are examples of the present technology, and partial replacement or combination of the configurations shown in the different embodiments is possible.

The X direction in the drawings corresponds to the width direction of the battery pack 1, the Y direction corresponds to the depth direction of the battery pack 1, and the Z direction corresponds to the height direction of the battery pack 1. The X direction, the Y direction, and the Z direction are orthogonal to each other. In the X direction, a side indicated by an arrow is defined as a +X side, and a side opposite to the +X side is defined as a −X side. In the Y direction, a side indicated by an arrow is defined as a +Y side, and a side opposite to the +Y side is defined as a −Y side. In the Z direction, a side indicated by an arrow is defined as a +Z side, and a side opposite to the +Z side is defined as a −Z side. Note that the X, Y, and Z directions are examples, and the present disclosure is not limited to these directions.

FIG. 1 is a perspective view of a battery pack 1 according to the first embodiment of the present disclosure. The battery pack 1 includes an exterior case 11 and a battery unit 12. The exterior case 11 has a box shape and houses the battery unit 12.

The exterior case 11 has three fitting portions **11*a* into which terminals T of an external device described later is fitted. The terminal T of the external device has a plate shape, and the fitting portion 11*a*** is a pair of plate members sandwiching the terminal T of the external device.

Figure 2:
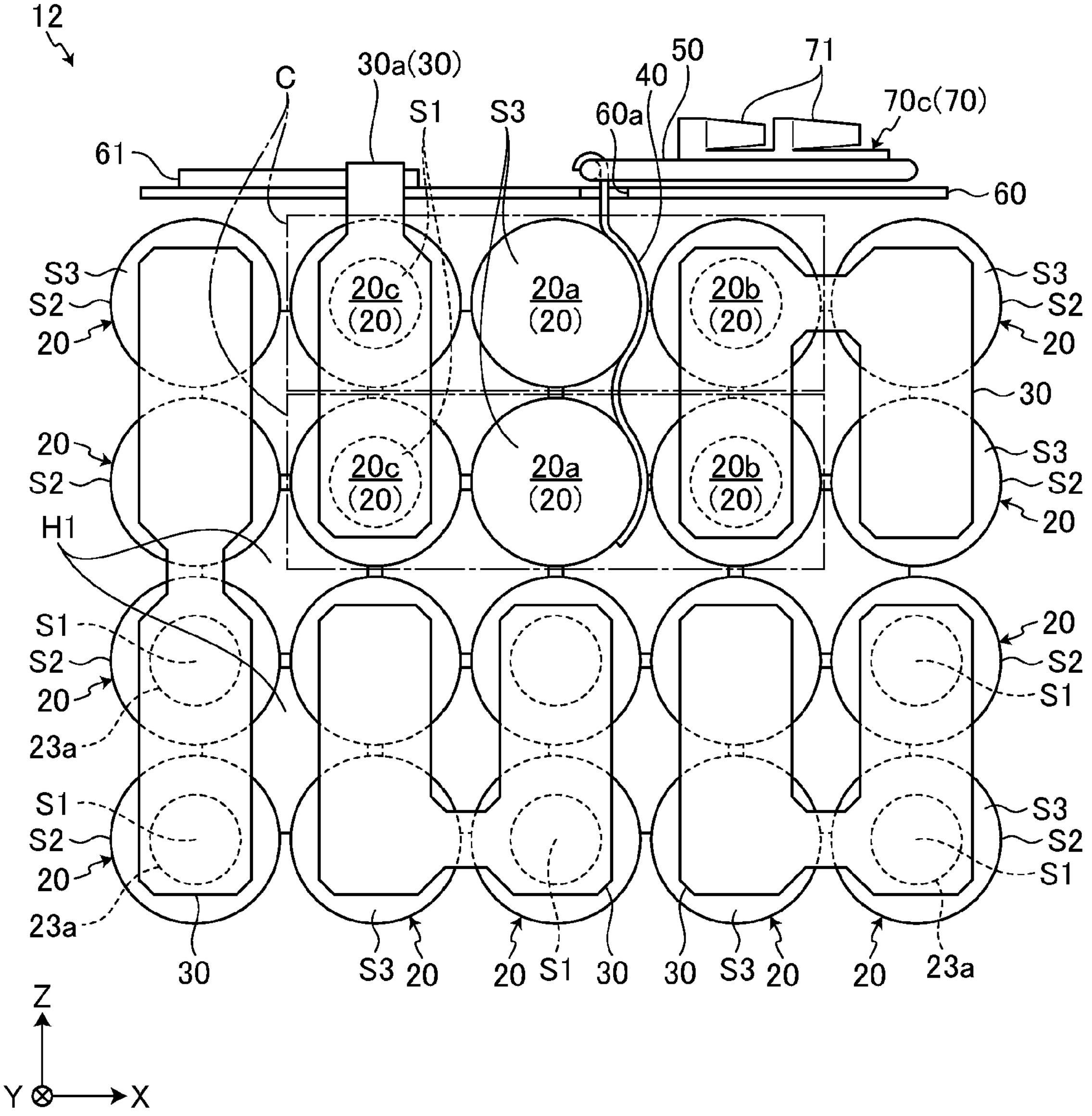
FIG. 2 is a front view of a battery unit.
Figure 3:
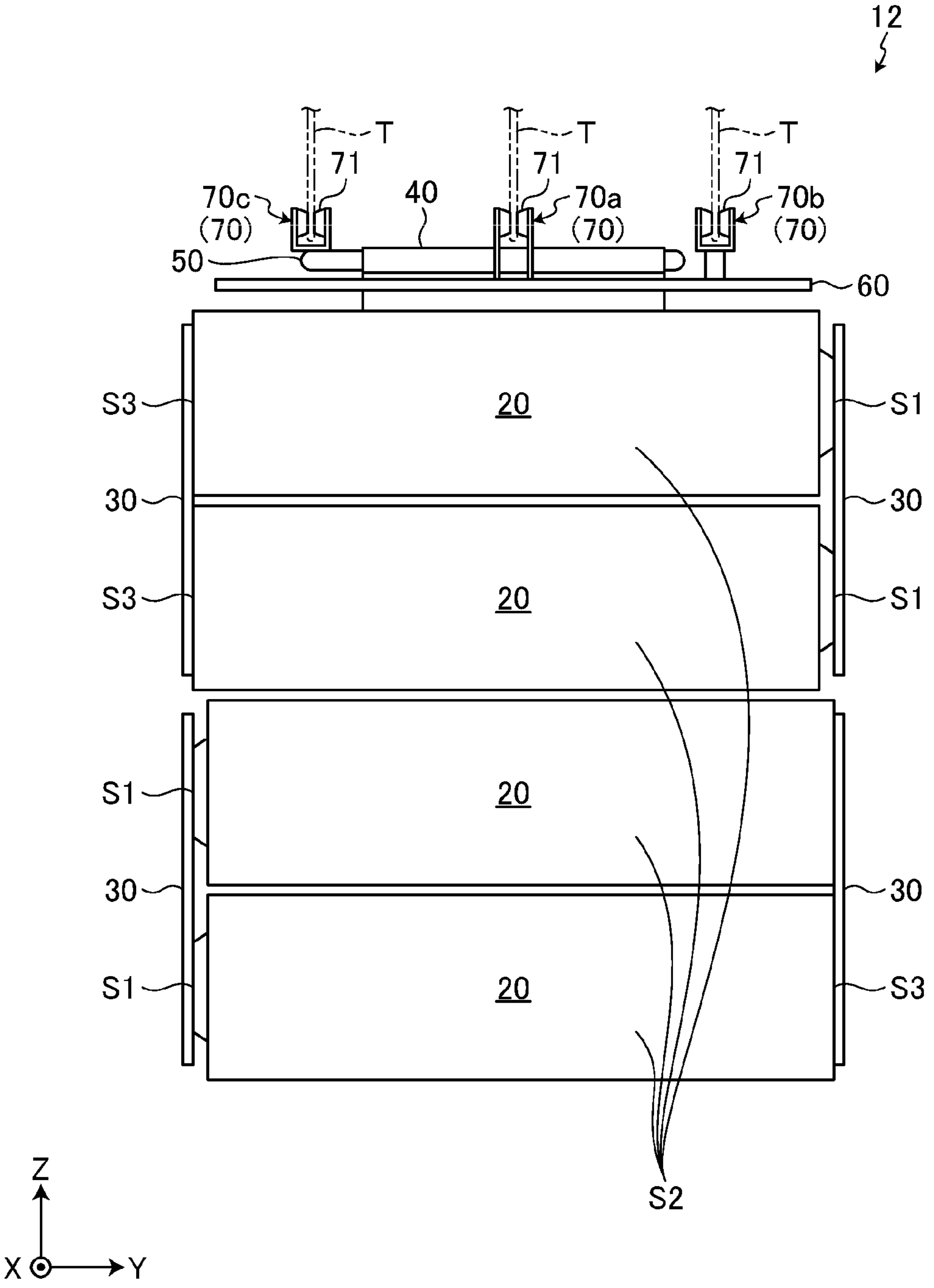
FIG. 3 is a side view of the battery unit.
Figure 4:
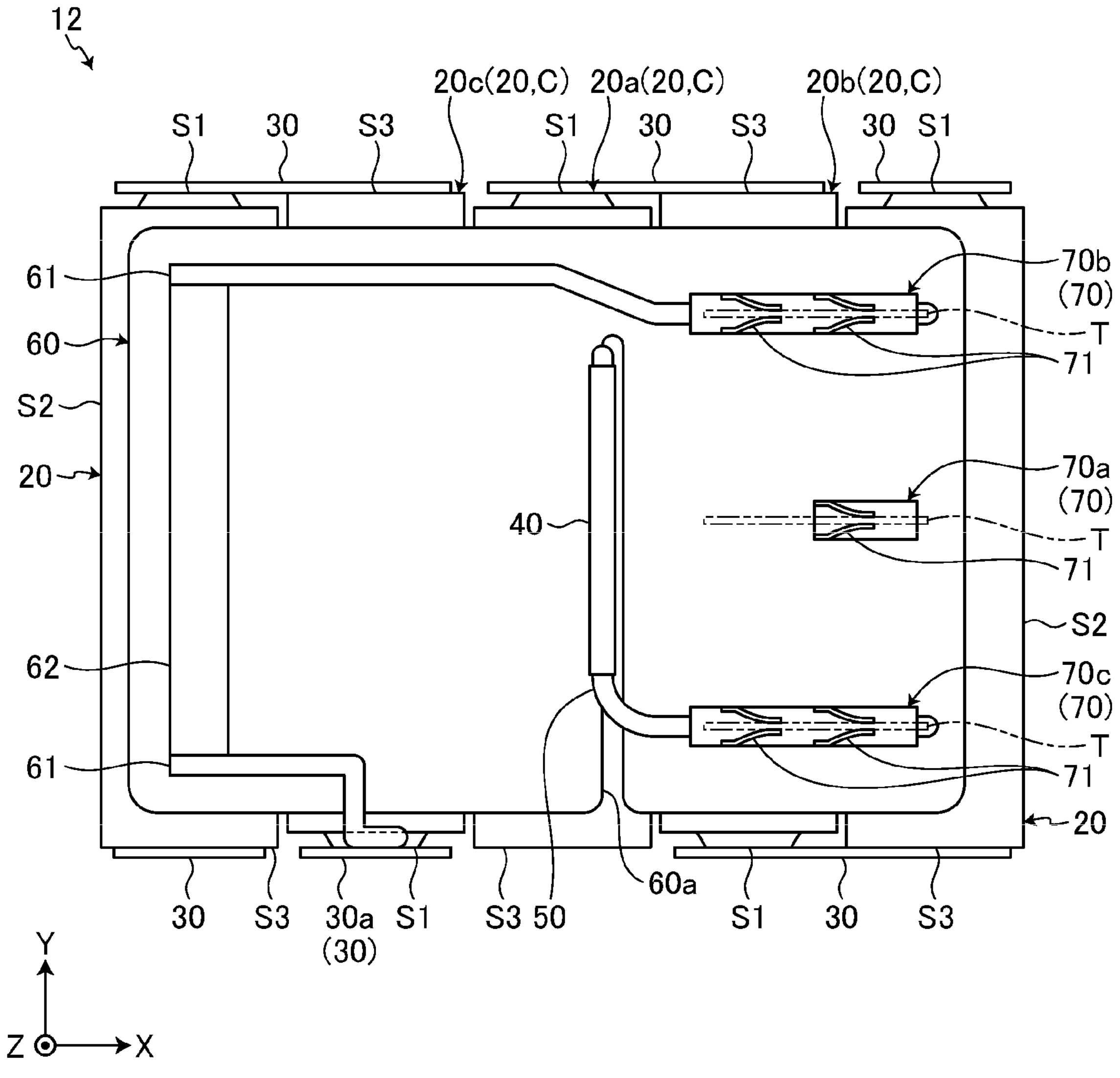
FIG. 4 is a top view of the battery unit.

FIG. 2 is a front view of the battery unit 12. FIG. 3 is a side view of the battery unit 12. FIG. 4 is a top view of the battery unit 12. The battery unit 12 includes a plurality of secondary batteries 20, a plurality of first current collecting tabs 30, a second current collecting tab 40, a heat transfer member 50, a control board 60, and an external connection terminal 70.

The secondary battery 20 is, for example, a lithium ion battery. The secondary battery 20 has a cylindrical shape. The number of the secondary batteries 20 is two or more. In the first embodiment, the number of the secondary batteries 20 is 20, but it is needless to say that the number is not limited to 20.

As shown in FIGS. 2 and 3, the plurality of secondary batteries 20 is arranged in parallel. The central axes of the plurality of secondary batteries 20 are along the Y direction and are substantially parallel to each other.

As shown in FIG. 2, the plurality of secondary batteries 20 are arranged in a matrix in a front view viewed along the Y direction. Hereinafter, among the plurality of secondary batteries 20, five secondary batteries 20 arranged in the X direction at the most +Z side are referred to as secondary batteries 20 in the first row. Further, the secondary batteries 20 in the second row, the secondary batteries 20 in the third row, and the secondary batteries 20 in the fourth row are arranged in this order from the secondary batteries 20 in the first row toward the −Z side along the Z direction.

In the plurality of secondary batteries 20, four secondary batteries 20 arranged in the Z direction on the most −X side are defined as secondary batteries 20 in the first column. Further, the secondary batteries 20 in the second column, the secondary batteries 20 in the third column, the secondary batteries 20 in the fourth column, and the secondary batteries 20 in the fifth column are arranged in this order from the secondary batteries 20 in the first column toward the +X side along the X direction.

That is, the arrangement of the plurality of secondary batteries 20 is in the form of a matrix having four rows and five columns. It goes without saying that the number of rows and the number of columns of the plurality of secondary batteries 20 are not limited to four and five.

In the first embodiment, the plurality of secondary batteries 20 includes secondary batteries 20 disposed on both sides in the radial direction (that is, the direction orthogonal to the Y direction). For example, among the plurality of secondary batteries 20, in the secondary batteries 20 in the third column, the secondary batteries 20 in the second column, and the secondary batteries 20 in the fourth column are arranged in parallel on both sides in the X direction.

Figure 5:
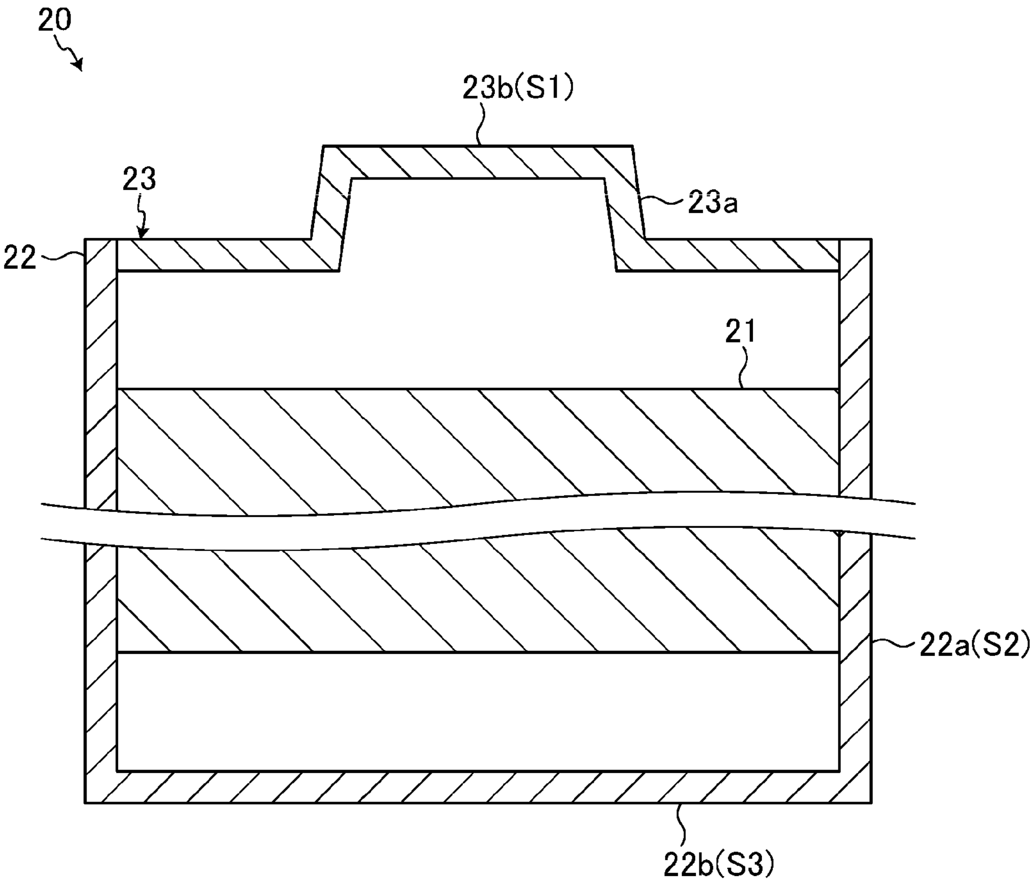
FIG. 5 is an axial sectional view of a secondary battery.

FIG. 5 is an axial sectional view of the secondary battery 20. The secondary battery 20 includes an electrode assembly 21, a can 22, and a lid 23. The can 22 and the lid 23 have electrical conductivity and thermal conductivity. The material of the can 22 and the lid 23 is, for example, an alloy containing iron, stainless steel, aluminum, and the like.

The electrode assembly 21 is formed by laminating and winding a plurality of sheet-like positive electrodes (not shown) and a plurality of sheet-like negative electrodes (not shown) with a separator (not shown) interposed therebetween.

The can 22 has a tubular shape having an opening on one end side. The can 22 is electrically connected to the negative electrode of the electrode assembly 21 via a current collecting foil (not shown). Both an outer peripheral surface 22*a* and an end surface 22*b* of the can 22 correspond to the negative electrode of the secondary battery 20.

The lid 23 has a plate shape and covers the opening on one end side of the can 22. The lid 23 and the can 22 are electrically insulated by an insulating member (not shown). The lid 23 is electrically connected to the positive electrode of the electrode assembly 21 via the current collecting foil. The lid 23 has a protrusion 23*a*. The protrusion 23*a* is located at the center of the lid 23. A protruding end surface 23*b* of the protrusion 23*a* is a positive electrode of the secondary battery 20. In addition, the protruding end surface 23*b* of the lid 23, the outer peripheral surface 22*a* and the end surface 22*b* of the can 22 correspond to a first end surface S1, an outer peripheral surface S2 and a second end surface S3 of the secondary battery 20, respectively. As shown in FIGS. 2 and 3, the plurality of secondary batteries 20 is arranged such that the first end surface S1 and the second end surface S3 are oriented in a predetermined direction.

A holder H1 shown in FIG. 2 is disposed between the plurality of secondary batteries 20 and holds the plurality of secondary batteries 20. Further, a part of the outer peripheral surface S2 of each of the secondary batteries 20 in the first and fifth columns among the plurality of secondary batteries 20 and a part of the outer peripheral surface S2 of each of the secondary batteries 20 in the fifth row are in contact with the inner surface of the exterior case 11.

The plurality of first current collecting tabs 30 have a plate shape, and electrically connect the plurality of secondary batteries 20 in series or in parallel. The first current collecting tab 30 has electrical conductivity and thermal conductivity. The first current collecting tab 30 contains at least one metal selected from the group consisting of copper, aluminum, iron, and nickel. In the first embodiment, the first current collecting tab 30 is made of a copper alloy. As shown in FIGS. 3 and 4, the first current collecting tab 30 is connected to the first end surface S1 and the second end surface S3 of the secondary battery 20 by resistance welding, ultrasonic welding, or the like.

As shown in FIG. 2, the plurality of first current collecting tabs 30 include one first current collecting tab 30*a* that electrically and thermally connects the first end surface S1 (positive electrode) of the secondary battery 20 and the control board 60. Specifically, one first current collecting tab 30*a* is connected to first end surfaces S1 of two secondary batteries 20 in the first row and the second row among five secondary batteries 20 in the second column. It goes without saying that the secondary battery 20 to which one first current collecting tab 30*a* is connected is not limited to the two secondary batteries 20.

The second current collecting tab 40 has a plate shape, and is electrically and thermally connected to the secondary battery 20 in which the secondary battery 20 is disposed on both sides in the radial direction and the heat transfer member 50. The second current collecting tab 40 has electrical conductivity and thermal conductivity. The second current collecting tab 40 contains at least one metal selected from the group consisting of copper, aluminum, iron, and nickel. In the first embodiment, the second current collecting tab 40 is made of a copper alloy.

Figure 6:
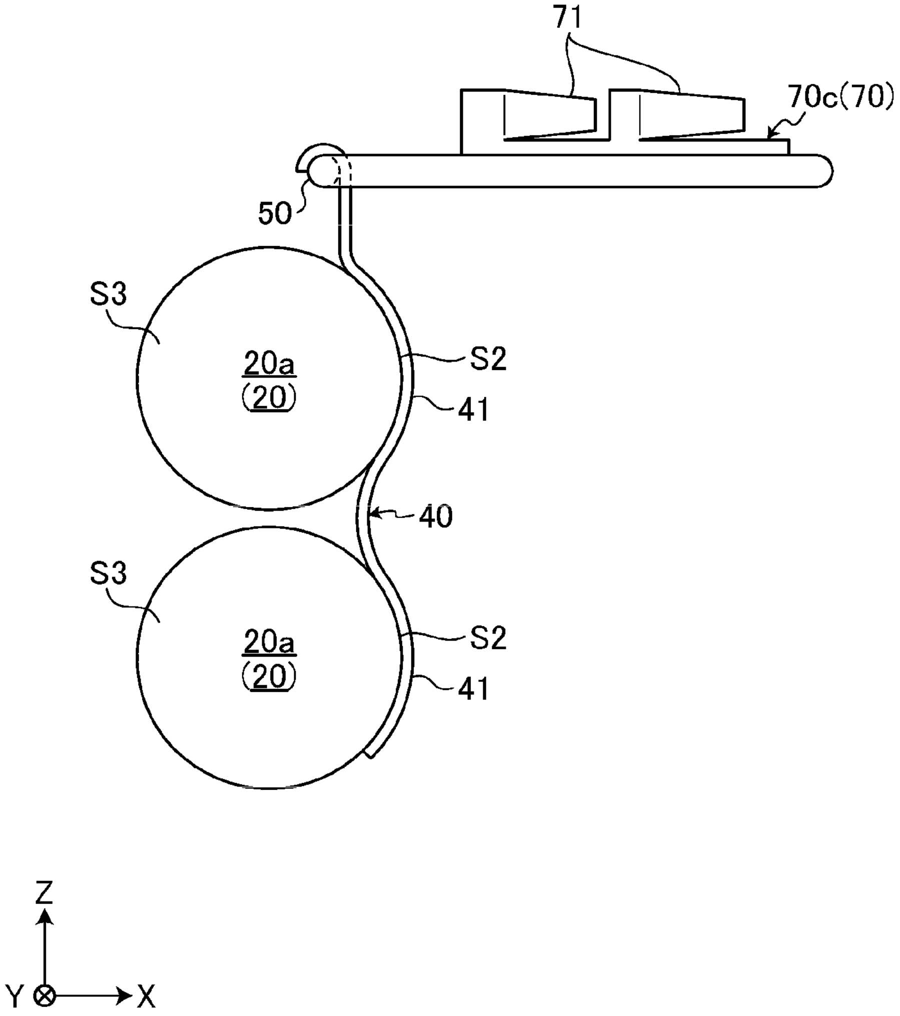
FIG. 6 is a front view illustrating a part of a battery unit.
Figure 7:
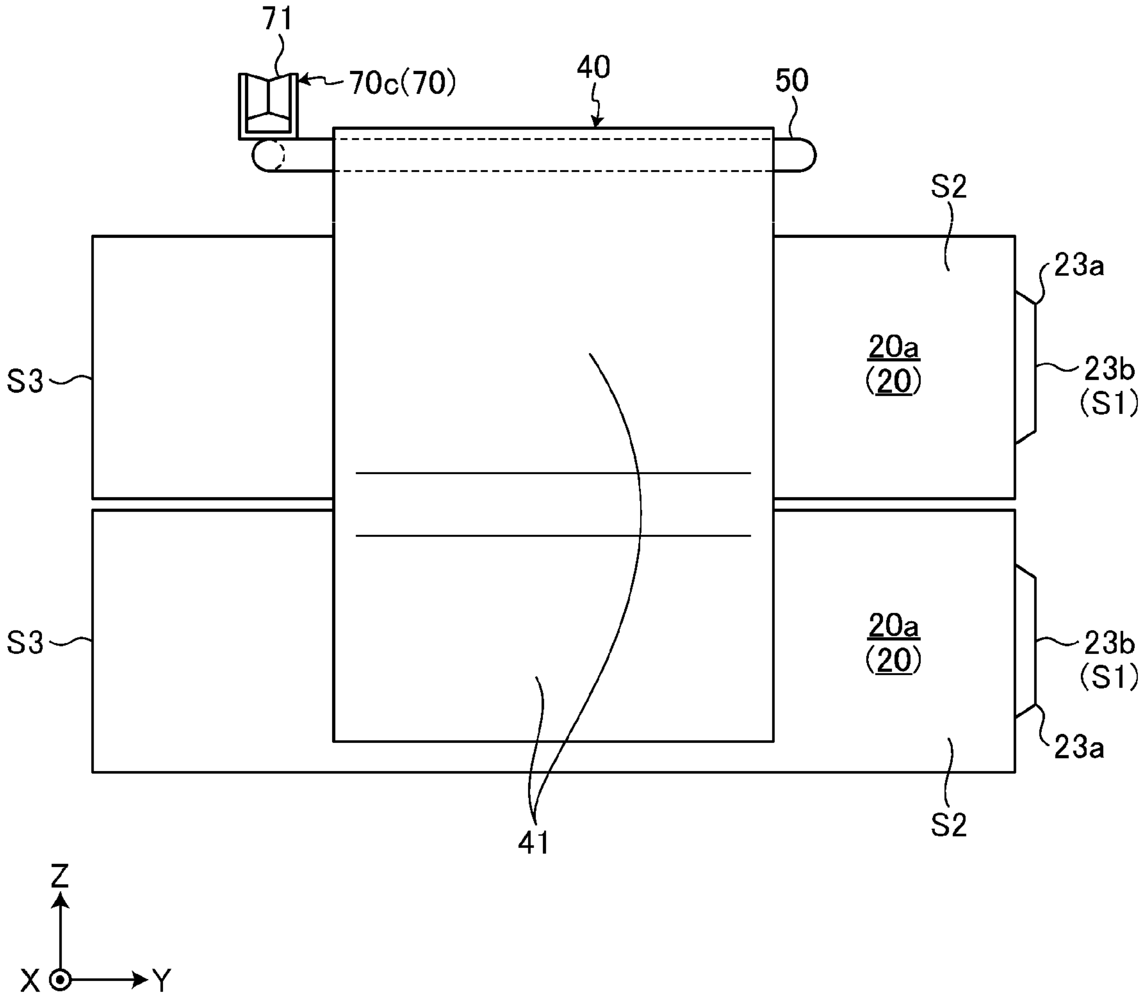
FIG. 7 is a side view of a part of the battery unit shown in FIG. 6.

FIG. 6 is a front view illustrating a part of the battery unit 12. FIG. 7 is a side view of a part of the battery unit 12 shown in FIG. 6. In the first embodiment, the first end portion of the second current collecting tab 40 is electrically and thermally connected to the outer peripheral surface S2 (negative electrode) of the secondary battery 20.

One end portion of the second current collecting tab 40 has two curved portions 41 having an arch-like cross section along the outer peripheral surface S2 of the secondary battery 20. The inner surface of the curved portion 41 and the outer peripheral surface S2 of the secondary battery 20 are electrically and thermally connected. It goes without saying that the number of the curved portions 41 is not limited to two.

The second end portion of the second current collecting tab 40 is electrically and thermally connected to the outer surface of the heat transfer member 50. The second current collecting tab 40 is connected to the outer peripheral surface S2 of the secondary battery 20 and the outer surface of the heat transfer member 50 by resistance welding, ultrasonic welding, or the like.

As shown in FIG. 2, among the plurality of secondary batteries 20, the secondary batteries 20 connected to the second current collecting tab 40 are two secondary batteries 20 in the third column and the first and second rows. A plurality of secondary batteries 20 is electrically connected in series or in parallel between the second current collecting tab 40 and one first current collecting tab 30*a*.

Hereinafter, each of the two secondary batteries 20 connected to the second current collecting tab 40 is referred to as a first secondary battery 20*a*, and each of the two secondary batteries 20 disposed on the +X side of the two secondary batteries 20 (first secondary batteries 20*a*) connected to the second current collecting tab 40 is referred to as a second secondary battery 20*b*. Further, each of the two secondary batteries 20 disposed on the −X side of the two secondary batteries 20 (first secondary battery 20*a*) connected to the second current collecting tab 40 is referred to as a third secondary battery 20*c*. The plurality of secondary batteries 20 will be simply referred to as “secondary batteries 20” when described without distinction.

As shown in FIG. 2, in the first embodiment, since the number of the secondary batteries 20 (that is, the first secondary batteries 20*a*) connected to the second current collecting tab 40 is two, the plurality of secondary batteries 20 includes two of a set of secondary batteries C constituted by the first secondary battery 20*a*, the second secondary battery 20*b*, and the third secondary battery 20*c*. Needless to say, the number of the secondary batteries 20 connected to the second current collecting tab 40 is not limited to two, and the number of the secondary batteries C in one set is not limited to two.

As described above, in each of the two sets of secondary batteries C, the first secondary battery 20*a* and the second secondary battery 20*b* are arranged in parallel. The first secondary battery 20*a* is disposed in parallel with the second secondary battery 20*b* and the third secondary battery 20*c* between the third secondary battery 20*c* and the second secondary battery 20*b*. As shown in FIG. 4, in the set of secondary batteries C, the first current collecting tab 30 connects the first secondary battery 20*a* and the second secondary battery 20*b*.

The first secondary battery 20*a* may be the secondary battery 20 in which the secondary batteries 20 are disposed on both sides in the radial direction, and is not limited to the two secondary batteries 20 in the third column and the first and second rows. The second secondary battery 20*b* and the third secondary battery 20*c* may be the secondary batteries 20 disposed on both sides of the first secondary battery 20*a* in the radial direction, and may be the secondary batteries 20 disposed on both sides of the first secondary battery 20*a* in the Z direction or on both sides of the first secondary battery 20*a* in the direction inclined with the X direction and the Z direction.

As shown in FIGS. 2, 3, and 4, the heat transfer member 50 is disposed on the control board 60, and electrically and thermally connects the first secondary battery 20*a* and the external connection terminal 70. The first end portion of the heat transfer member 50 is electrically and thermally connected to the second current collecting tab 40, and the second end portion of the heat transfer member 50 is electrically and thermally connected to the external connection terminal 70 (specifically, a negative electrode terminal 70*c* to be described later). That is, the heat transfer member 50 electrically and thermally connects the first secondary battery 20*a* and the external connection terminal 70 via the second current collecting tab 40.

The heat transfer member 50 has a rod shape and has an L shape in a top view (see FIG. 4). The heat transfer member 50 is connected to the second current collecting tab 40 and the external connection terminal 70 by resistance welding, ultrasonic welding, or the like. The thermal conductivity of the heat transfer member 50 is higher than the thermal conductivity of the first current collecting tab 30 and the second current collecting tab 40.

Figure 8:
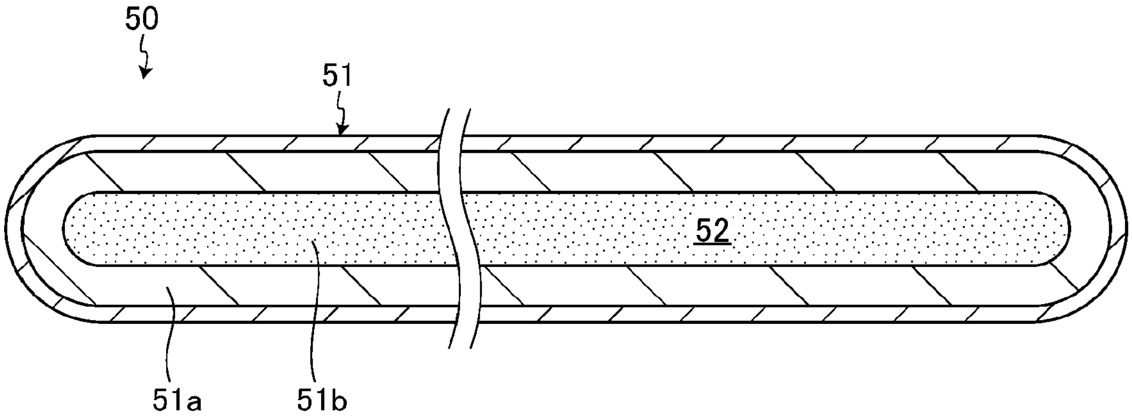
FIG. 8 is a sectional view of a heat transfer member.

FIG. 8 is a sectional view of the heat transfer member 50. The heat transfer member 50 is a so-called heat pipe. The heat transfer member 50 includes a case 51 and a hydraulic fluid 52 stored in the case 51.

The case 51 has a hollow rod shape. The case 51 has electrical conductivity and thermal conductivity. The case 51 is formed of, for example, a copper alloy, an aluminum alloy, or the like. The inner portion of the case 51 has a wick portion 51*a* having a capillary structure. The wick portion 51*a* is formed on the inner surface of the case 51. In addition, the case 51 has a passage 51*b* on the center side of the case 51 with respect to the wick portion 51*a*. The hydraulic fluid 52 is, for example, water, ethanol, or the like, and is in the wick portion 51*a* and the passage 51*b*.

Note that a structure using a capillary phenomenon is appropriately selected for the wick portion 51*a*. Examples thereof include mesh, metal powder sintering, groove structure, composite material wick and the like.

The external connection terminal 70 shown in FIGS. 2, 3, and 4 is disposed on the control board 60. The external connection terminal 70 is detachably electrically and thermally connected to the external device.

Examples of the external device include a load device (for example, a power tool) using the battery pack 1 as a power source, and a charger electrically connected to an external power source (for example, a commercial power source) to charge the secondary battery 20. The external device has a terminal T electrically and thermally connected to the external connection terminal 70. The terminal T of the external device is a plate member having electrical conductivity and thermal conductivity. The external device includes members such as a control board (not shown) of the external device electrically and thermally connected to the terminal T and a case (not shown) of the external device thermally connected to the control board.

As shown in FIG. 4, the external connection terminal 70 includes a signal terminal 70*a*, a positive electrode terminal 70*b*, and a negative electrode terminal 70*c*. Hereinafter, when the signal terminal 70*a*, the positive electrode terminal 70*b*, and the negative electrode terminal 70*c* are described without distinction, they may be simply referred to as “external connection terminal 70”.

Each of the signal terminal 70*a*, the positive electrode terminal 70*b*, and the negative electrode terminal 70*c* has a pair of pressing plates 71 that press each other.

The pair of pressing plates 71 is located inside the fitting portion 11*a* shown in FIG. 1. As shown in FIGS. 3 and 4, the pair of pressing plates 71 sandwiches the terminal T of the external device, whereby the external connection terminal 70 and the terminal T of the external device are electrically and thermally connected.

The control board 60 transmits and receives a control signal to and from the external device via the signal terminal 70*a*. The control signal is, for example, a signal indicating that the secondary battery 20 is in a fully charged state.

As shown in FIG. 4, the positive electrode terminal 70*b* is electrically and thermally connected to one first current collecting tab 30*a* via a conductor 61 (for example, wiring) disposed on the control board 60 and an element 62 (components constituting a protection circuit such as a temperature fuse, an FET, and an SCP) disposed on the control board 60. The conductor 61 and the element 62 have electrical conductivity and thermal conductivity. In the present specification, the object having thermal conductivity means that heat flows through the object, and indicates that the thermal conductivity of the object is greater than 0. That is, the positive electrode terminal 70*b* is electrically and thermally connected to the first end surface S1 (positive electrode) of the third secondary battery 20*c* via one first current collecting tab 30*a*.

The negative electrode terminal 70*c* is electrically and thermally connected to the heat transfer member 50. That is, the negative electrode terminal 70*c* is electrically and thermally connected to the outer peripheral surface S2 (negative electrode) of the first secondary battery 20*a* via the heat transfer member 50 and the second current collecting tab 40.

Between the positive electrode terminal 70*b* and the negative electrode terminal 70*c*, the plurality of secondary batteries 20 are electrically connected in parallel or in series via the plurality of first current collecting tabs 30, the second current collecting tabs 40, and the heat transfer member 50.

The control board 60 controls charging and discharging of the secondary battery 20. When an external device is connected to the external connection terminal 70, the control board 60 controls charging and discharging of the secondary battery 20 via the positive electrode terminal 70*b* and the negative electrode terminal 70*c* based on the control signal.

As shown in FIGS. 2 and 4, the control board 60 has a slit 60*a*. The second current collecting tab 40 passes through the slit 60*a*. In the present embodiment, since the control board 60 has the slit 60*a*, the length of the second current collecting tab 40 in the Y direction can be increased (see FIG. 4). The second current collecting tab 40 having this structure can efficiently transfer heat of the first secondary battery 20*a* to the second current collecting tab 40.

Next, heat dissipation of the secondary battery 20 will be described. When an external device is connected to the external connection terminal 70 and the secondary battery 20 is charged or discharged, the secondary battery 20 generates heat. Heat of the secondary battery 20 is released to the outside through the holder H1 and the exterior case 11.

However, among the plurality of secondary batteries 20, the secondary batteries 20 in which the secondary batteries 20 are disposed on both sides in the radial direction, for example, the first secondary battery 20*a*, are surrounded by the third secondary battery 20*c*, the second secondary battery 20*b*, and the other secondary batteries 20. Therefore, the heat of the first secondary battery 20*a* is hardly released. Therefore, as described above, the second current collecting tab 40 is electrically and thermally connected to the outer peripheral surface S2 of the first secondary battery 20*a*. The heat of the first secondary battery 20*a* is transferred to the second current collecting tab 40.

The heat of the first secondary battery 20*a* transferred to the second current collecting tab 40 is transferred to the first end portion of the heat transfer member 50. As a result, the hydraulic fluid 52 absorbs the heat of the first secondary battery 20*a* at the wick portion 51*a* at the first end portion of the heat transfer member 50 and evaporates, and the evaporated hydraulic fluid 52 moves to the second end portion of the heat transfer member 50 through the passage 51*b*. The heat of the hydraulic fluid 52 is transferred to the negative electrode terminal 70*c* through the case 51 at the wick portion 51*a* at the second end portion of the heat transfer member 50, whereby the hydraulic fluid 52 is condensed. The condensed hydraulic fluid 52 returns to the first end portion of the heat transfer member 50 through the wick portion 51*a*.

As described above, the circulation of the hydraulic fluid 52 causes the heat of the first secondary battery 20*a* to be conducted from the first end to the second end of the heat transfer member 50, and to be transmitted from the second end of the heat transfer member 50 to the negative electrode terminal 70*c*.

The heat of the first secondary battery 20*a* transferred to the negative electrode terminal 70*c* is transferred to the terminal T of the external device. Furthermore, the heat of the first secondary battery 20*a* transmitted to the terminal T of the external device is released to the outside from a member such as a case of the external device via an internal structure of the external device such as a control board of the external device and wiring of the external device. When a cooling fan for cooling the inside is housed in the external device, the heat of the first secondary battery 20*a* transmitted to the external device is efficiently released to the outside.

As described above, the heat of the first secondary battery 20*a* is released from the external device to the outside via the second current collecting tab 40, the heat transfer member 50, and the negative electrode terminal 70*c*. Therefore, in this case, the amount of heat released from the first secondary battery 20*a* to the outside is larger than that in a case where the first secondary battery 20*a* is not electrically and thermally connected to the negative electrode terminal 70*c*. Therefore, the heat dissipation performance of the battery pack 1 can be improved.

The heat transfer member 50 having a higher thermal conductivity than the first current collecting tab 30 and the second current collecting tab 40 transfers heat of the first secondary battery 20*a*. Therefore, as compared with a case where the first secondary battery 20*a* and the negative electrode terminal 70*c* are electrically and thermally connected only through the second current collecting tab 40 without using the heat transfer member 50, heat of the first secondary battery 20*a* is transmitted to the negative electrode terminal 70*c* at an early stage.

Further, the first secondary battery 20*a* and the heat transfer member 50 are connected via the second current collecting tab 40. The second current collecting tab 40 has a plate shape, and can be electrically and thermally connected to the secondary battery 20 in which the secondary batteries 20 are disposed on both sides in the radial direction like the first secondary battery 20*a* without increasing the size of the battery pack 1. Therefore, when the plurality of secondary batteries 20 are arranged in a matrix, the heat of the secondary batteries 20 arranged inside the plurality of secondary batteries 20 like the first secondary battery 20*a* can be efficiently transmitted to the negative electrode terminal 70*c*.

The second current collecting tab 40 is electrically and thermally connected to the outer peripheral surface S2 having a larger surface area than the second end surface S3 in the first secondary battery 20*a*. In this case, the heat of the first secondary battery 20*a* is efficiently transmitted to the second current collecting tab 40 as compared with the case where the second current collecting tab 40 is electrically and thermally connected only to the second end surface S3.

The heat of the third secondary battery 20*c* is released from the external device to the outside through the one first current collecting tab 30*a*, the conductor 61, the element 62, and the positive electrode terminal 70*b*.

In addition, accommodating the cooling fan in the exterior case 11 or adding a heat dissipation plate to the exterior case 11 for cooling the secondary battery 20 may increase the size of the battery pack 1. On the other hand, in the battery pack 1 of the first embodiment, the heat dissipation performance can be improved without increasing the size of the battery pack 1 by thermally connecting the first secondary battery 20*a* and the negative electrode terminal 70*c*.

Further, in the battery pack 1 of the first embodiment, the heat dissipation performance can be improved as described above without forming a through hole in the exterior case 11 of the battery pack 1. Therefore, it is possible to improve heat dissipation performance while preventing foreign matters and moisture from entering the battery pack 1.

Figure 9:
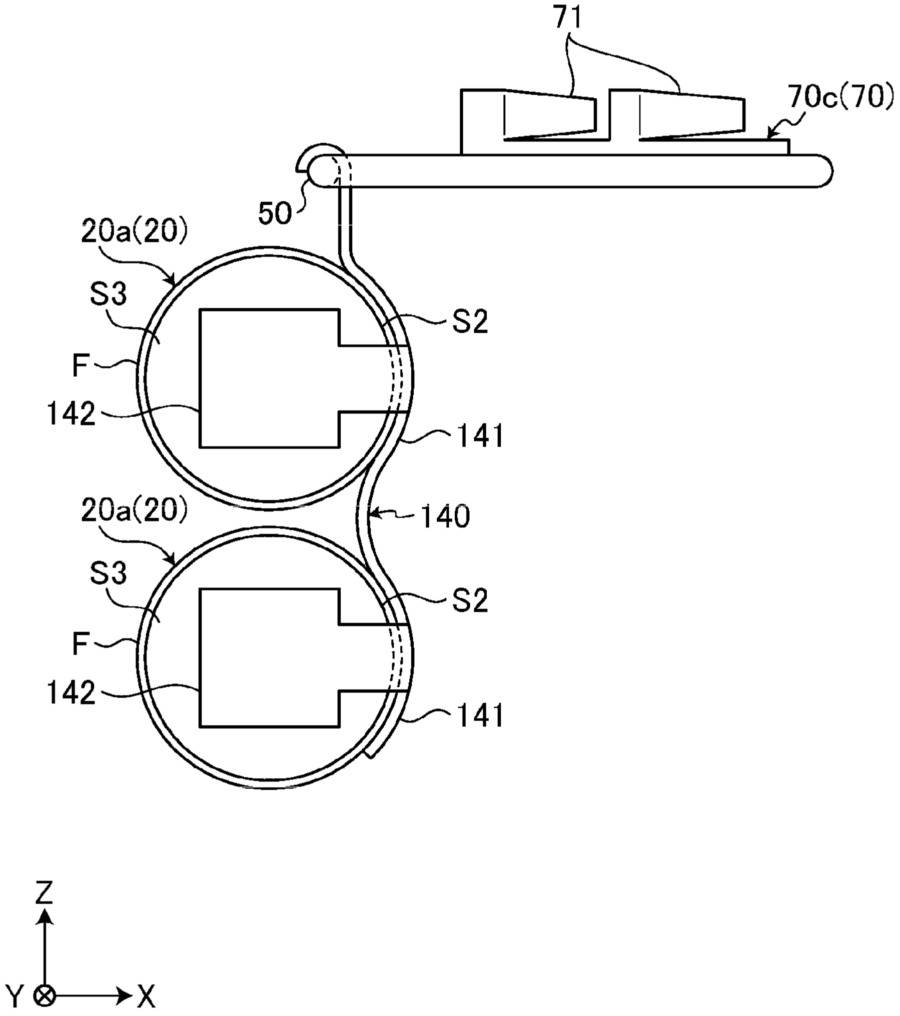
FIG. 9 is a front view illustrating a part of a battery unit according to an embodiment of the present disclosure.
Figure 10:
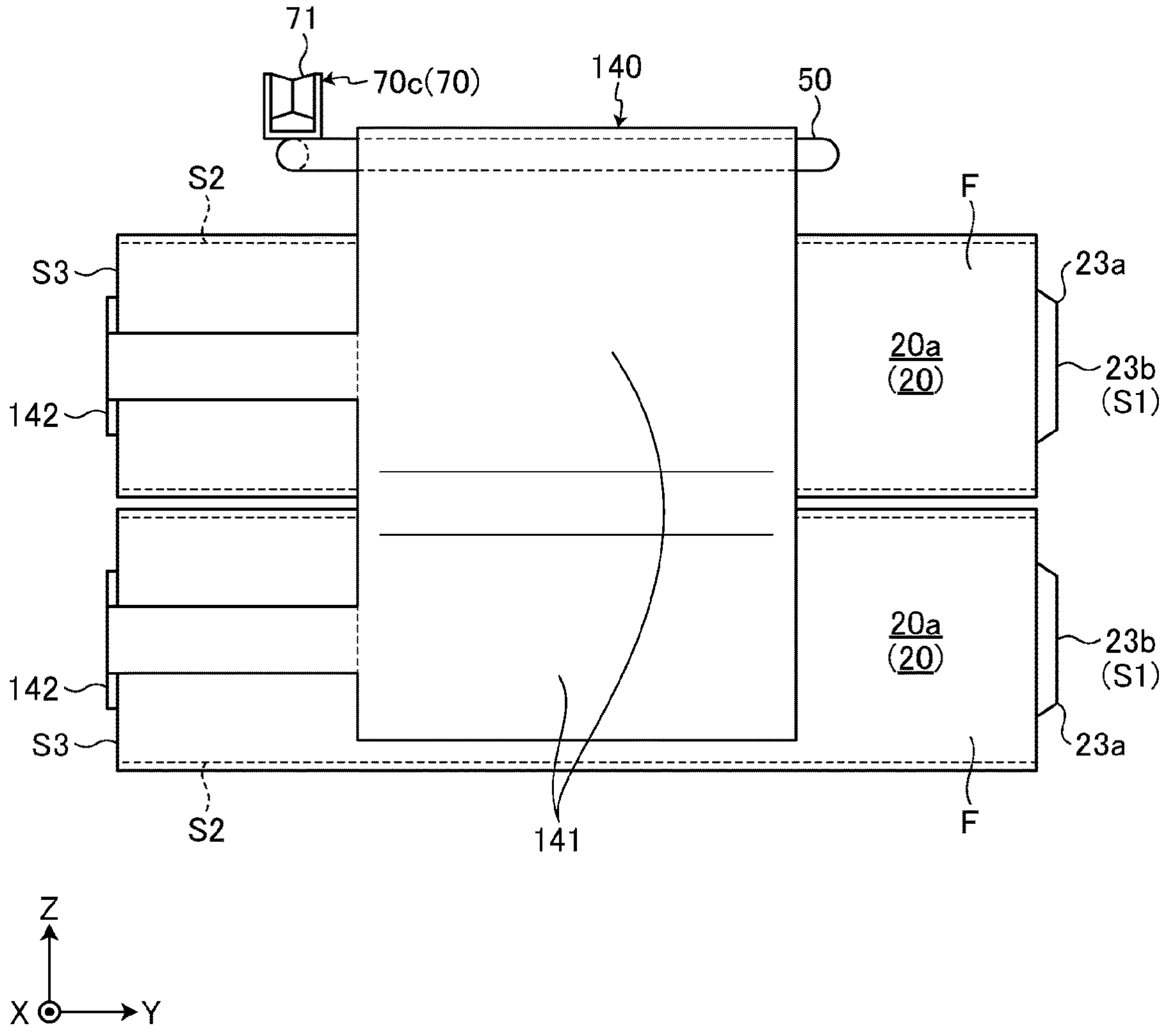
FIG. 10 is a side view of the part of the battery unit shown in FIG. 9.

FIG. 9 is a front view illustrating a part of a battery unit 12 according to a first modification of the first embodiment of the present disclosure. FIG. 10 is a side view of a part of the battery unit 12 shown in FIG. 9.

As compared with the first embodiment, in the secondary battery 20 of the first modification, an insulating film F is disposed over the entire periphery on the outer peripheral surface S2 of the secondary battery 20. In this case, the outer peripheral surface S2 of the secondary battery 20 and the curved portion 141 of the second current collecting tab 140 are electrically insulated and thermally connected.

The second current collecting tab 140 of the first modification is electrically and thermally connected to the second end surface S3 (negative electrode) of the first secondary battery 20*a*. Specifically, the curved portion 141 of the second current collecting tab 140 has an extension portion 142 electrically and thermally connected to the second end surface S3 of the secondary battery 20.

The extension portion 142 has a plate shape and extends from the curved portion 141 to the second end surface S3 of the secondary battery 20. The distal end portion of the extension portion 142 and the second end surface S3 of the first secondary battery 20*a* are connected by resistance welding, ultrasonic welding, or the like. Therefore, when the insulating film F is disposed on the outer peripheral surface S2 of the secondary battery 20, the first secondary battery 20*a* and the second current collecting tab 140 are electrically connected.

That is, in the first modification, the second end surface S3 of the first secondary battery 20*a* and the negative electrode terminal 70*c* are electrically connected via the second current collecting tab 140 and the heat transfer member 50. The heat of the first secondary battery 20*a* is transmitted from the outer peripheral surface S2 and the second end surface S3 of the first secondary battery 20*a* to the negative electrode terminal 70*c* via the second current collecting tab 140 and the heat transfer member 50. Therefore, when the insulating film F is present on the entire periphery of the outer peripheral surface S2 of the secondary battery 20, the first secondary battery 20*a* and the negative electrode terminal 70*c* are electrically connected, and the heat of the first secondary battery 20*a* is efficiently released from the external device via the second current collecting tab 140, the heat transfer member 50, and the negative electrode terminal 70*c*.

In the first modification, the extension portion 142 of the second current collecting tab 140 may be electrically and thermally connected to the first end surface S1 (positive electrode) of the secondary battery 20. In this case, the heat transfer member 50 electrically and thermally connects the second current collecting tab 140 and the positive electrode terminal 70*b*. Besides, in this case, the heat of the first secondary battery 20*a* is transmitted from the outer peripheral surface S2 and the first end surface S1 of the first secondary battery 20*a* to the positive electrode terminal 70*b* via the second current collecting tab 140 and the heat transfer member 50, and is released from the external device to the outside. Moreover, in this case, one first current collecting tab 30*a* electrically and thermally connects the second end surface S3 (negative electrode) of the secondary battery 20 and the negative electrode terminal 70*c* via the conductor 61 and the element 62.

In the first modification, the secondary battery 20 may not include the insulating film F. In this case, the second current collecting tab 140 is electrically and thermally connected to the outer peripheral surface S2 and the second end surface S3 of the secondary battery 20. Therefore, as compared with the first embodiment, the contact area between the secondary battery 20 and the second current collecting tab 140 is increased, and the heat of the secondary battery 20 is efficiently transferred.

Figure 11:
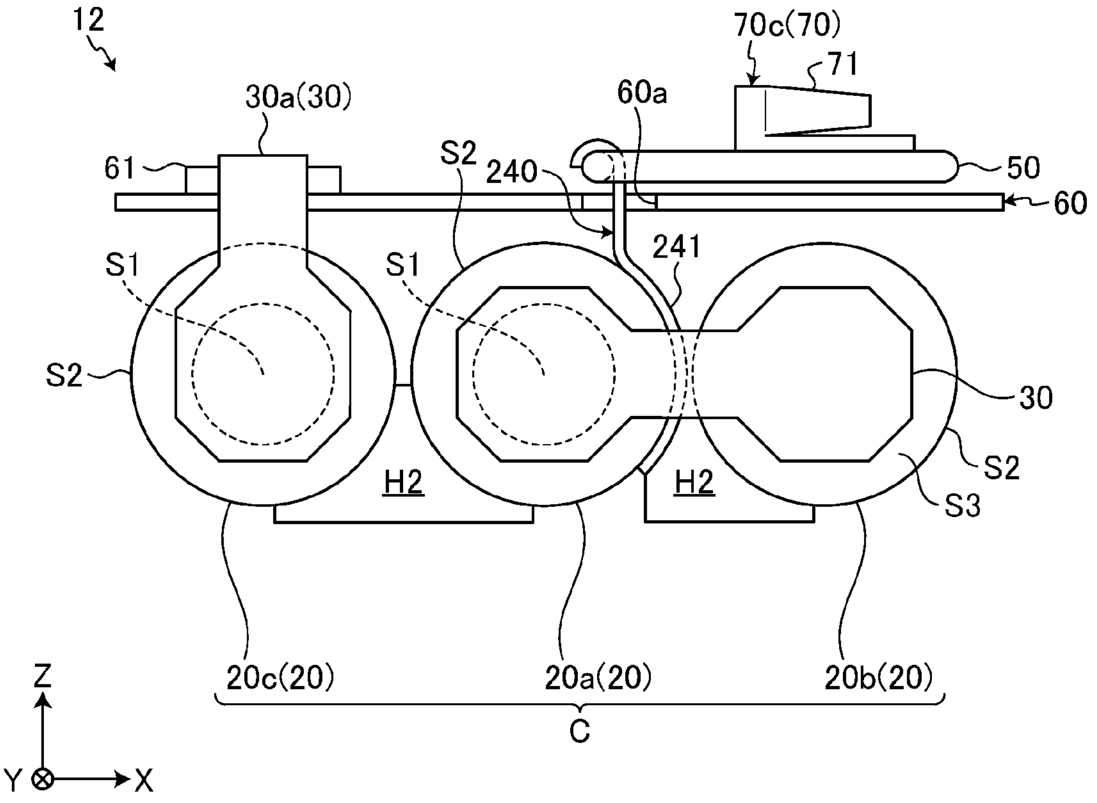
FIG. 11 is a front view of a battery unit according to an embodiment of the present disclosure.

FIG. 11 is a front view of a battery unit 12 according to a second modification of the first embodiment of the present disclosure.

As compared with the first embodiment described above, in the present second modification, the number of secondary batteries 20 is three. The first secondary battery 20*a*, the second secondary battery 20*b*, and the third secondary battery 20*c* constitute a set of secondary batteries C. In the second modification, the second current collecting tab 240 has one curved portion 241, and one first secondary battery 20*a* is electrically and thermally connected to the second current collecting tab 240.

The plurality of secondary batteries 20 of the second modification are in contact with the exterior case 11 with the holder H2 interposed therebetween, and are not in direct contact with the inner surface of the exterior case 11. Therefore, the heat of the plurality of secondary batteries 20 is hardly released from the exterior case 11. As described above, in a state where the heat of the secondary batteries 20 is hardly released from the exterior case 11, the heat of the plurality of secondary batteries 20 is efficiently released from the external device through the first current collecting tab 30, the second current collecting tab 240, the heat transfer member 50, and the external connection terminal 70.

Figure 12:
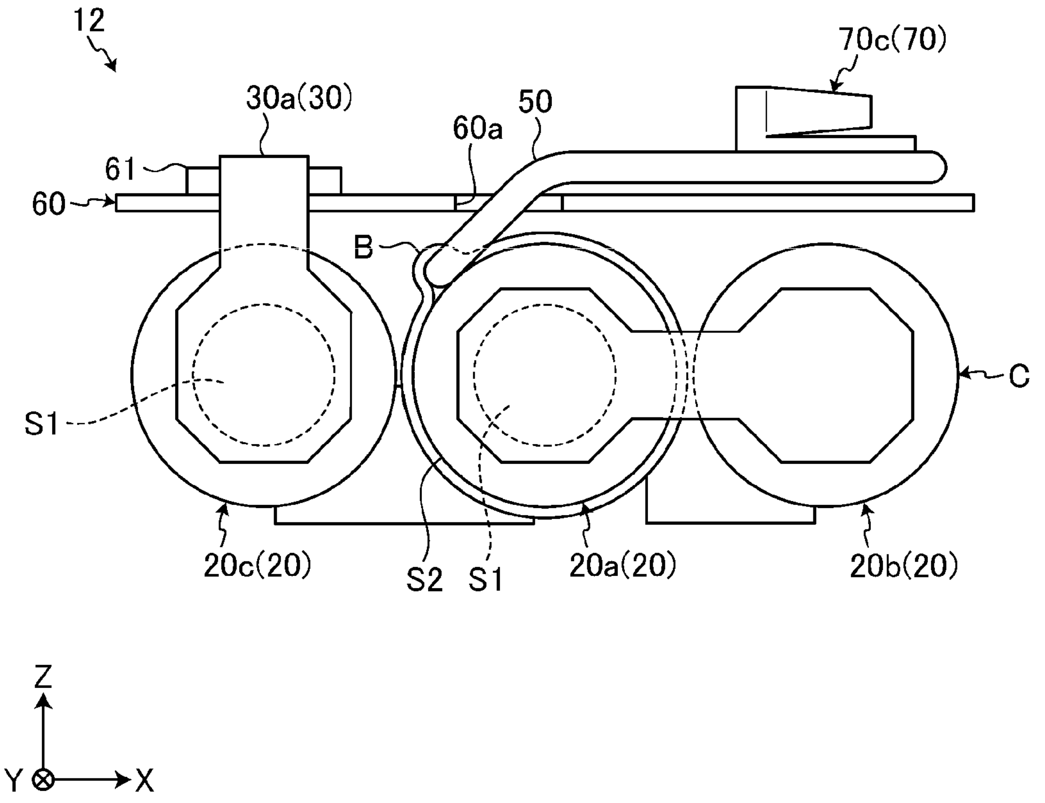
FIG. 12 is a front view of a battery unit according to an embodiment of the present disclosure.
Figure 13:
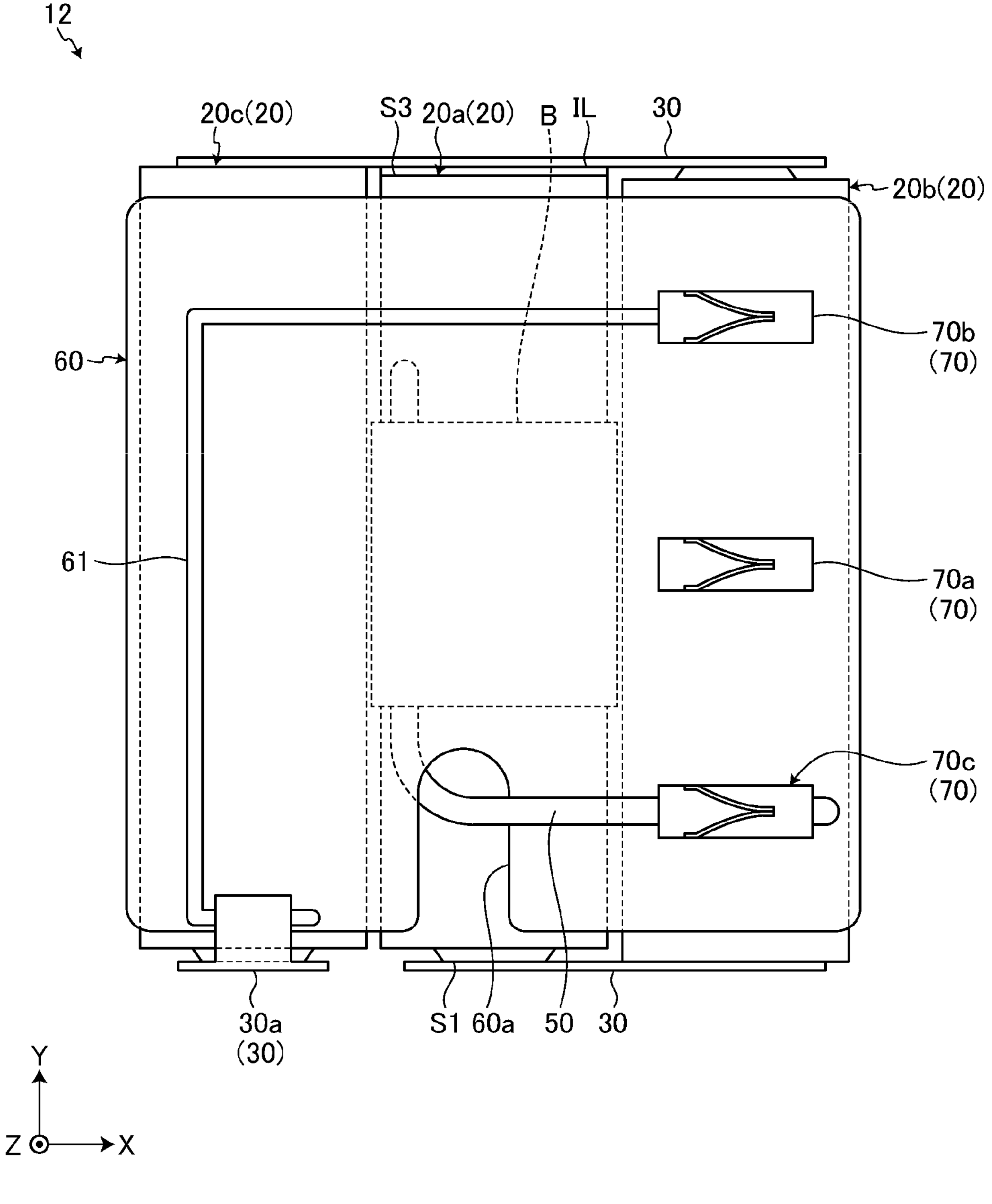
FIG. 13 is a top view of the battery unit shown in FIG. 12.

FIG. 12 is a front view of a battery unit 12 according to a third modification of the first embodiment of the present disclosure. FIG. 13 is a top view of the battery unit 12 shown in FIG. 12. The insulating member IL shown in FIG. 13 electrically insulates the second end surface S3 of the first secondary battery 20*a* from the first current collecting tab 30.

As compared with the second modification of the first embodiment, the battery unit 12 of the third modification does not include the second current collecting tab 240. In the battery unit 12 of the third modification, the heat transfer member 50 is electrically and thermally directly connected to the outer peripheral surface S2 of the first secondary battery 20*a*.

Specifically, the heat transfer member 50 is attached to the first secondary battery 20*a* by a fastening band B in a state where the outer surface of the first end of the heat transfer member 50 and the outer peripheral surface S2 of the first secondary battery 20*a* are in close contact with each other. The fastening band B is made of metal having electrical conductivity and thermal conductivity. As a result, the heat transfer member 50 can efficiently transfer the heat of the first secondary battery 20*a* to the external connection terminal 70. Therefore, the heat of the first secondary battery 20*a* is efficiently released from the external device via the heat transfer member 50 and the external connection terminal 70. The outer peripheral surface S2 of the first secondary battery 20*a* and the negative electrode terminal 70*c* are electrically connected via the heat transfer member 50.

The heat transfer member 50 passes through the slit 60*a* of the control board 60. Therefore, it is possible to improve the degree of freedom of the layout of the battery unit 12 and reduce the size of the battery unit 12.

In the first embodiment, the heat transfer member 50 may be disposed in a state of passing through the slit 60*a* without the second current collecting tab 40 passing through the slit 60*a*.

The external connection terminal 70 may not include the pair of pressing plates 71. In this case, the external connection terminal 70 has, for example, a plate shape, and the plate surface of the external connection terminal 70 and the plate surface of the terminal T of the external device come into contact with each other, so that the external connection terminal 70 and the terminal T of the external device are electrically and thermally connected.

Further, the battery unit 12 may not include the holder H1, and the plurality of secondary batteries 20 may be held by so-called resin potting. In this case, after the battery unit 12 is housed in the exterior case 11, a thermosetting resin (for example, an epoxy resin) is injected into the exterior case 11, and the thermosetting resin is cured in a state of covering the plurality of secondary batteries 20.

Figure 14:
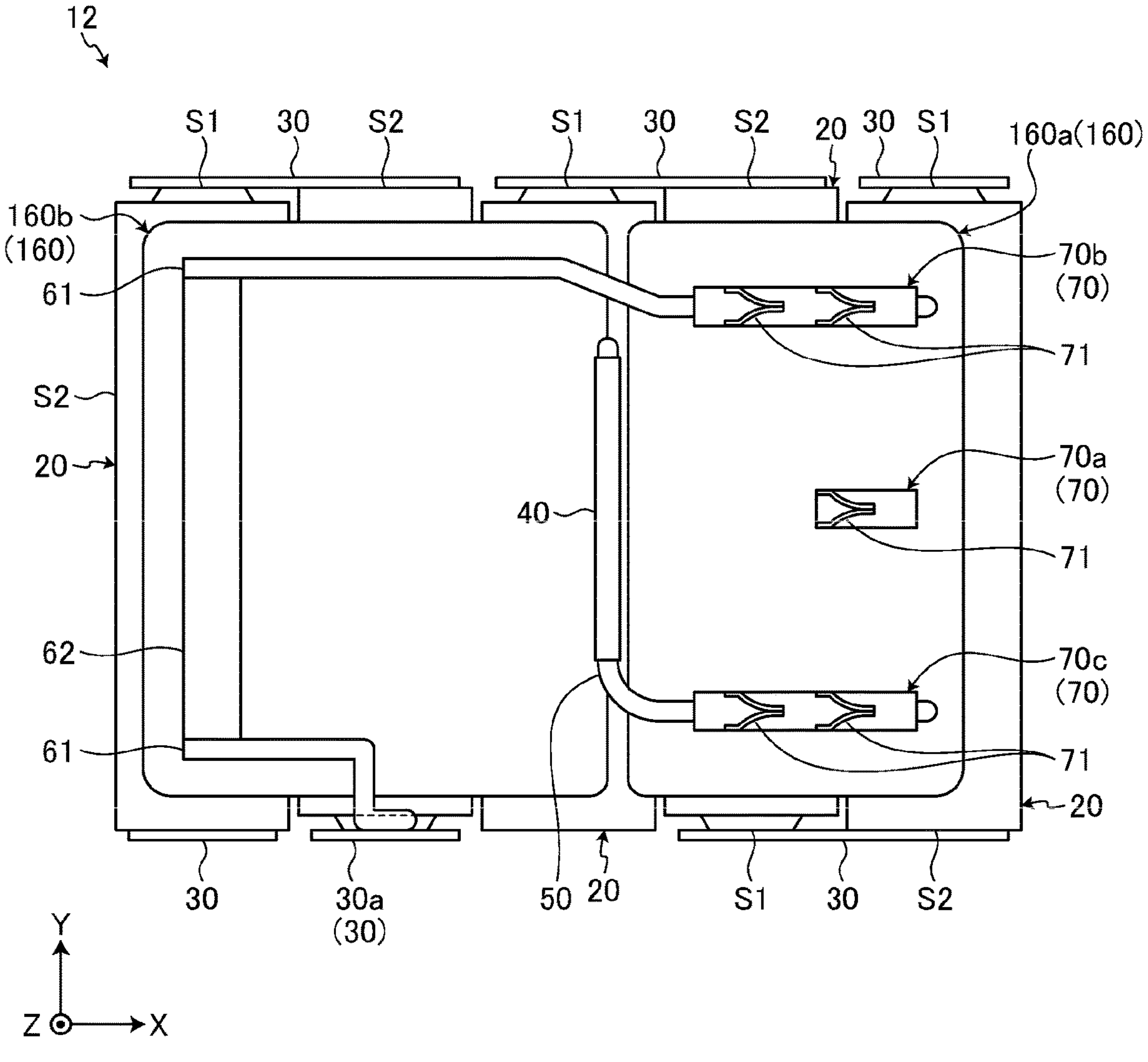
FIG. 14 is a top view of a battery unit according to an embodiment of the present disclosure.

FIG. 14 is a top view of a battery unit 12 according to another modification of the first embodiment of the present disclosure. In another modification, the control board 160 includes a first control board 160*a* on which the external connection terminal 70 is disposed and a second control board 160*b* disposed apart from the first control board 160*a*. In this case, the second current collecting tab 40 passes between the first control board 160*a* and the second control board 160*b*. When the control board 160 is applied to the third modification of the first embodiment, the heat transfer member 50 passes between the first control board 160*a* and the second control board 160*b*. According A to this, the degree of freedom of the layout of the battery unit 12 can be improved.

Furthermore, the element 62 may be an element having no thermal conductivity (for example, a field effect transistor). In this case, the positive electrode terminal 70*b* is thermally insulated from the third secondary battery 20*c*. Also in this case, the heat of the first secondary battery 20*a* is released from the external device to the outside via the second current collecting tab 40, the heat transfer member 50, and the negative electrode terminal 70*c*. Therefore, the heat dissipation performance of the battery pack 1 can be improved.

Next, a difference between the battery pack 1 according to the second embodiment of the present disclosure and the battery pack 1 according to the first embodiment will be mainly described.

Figure 15:
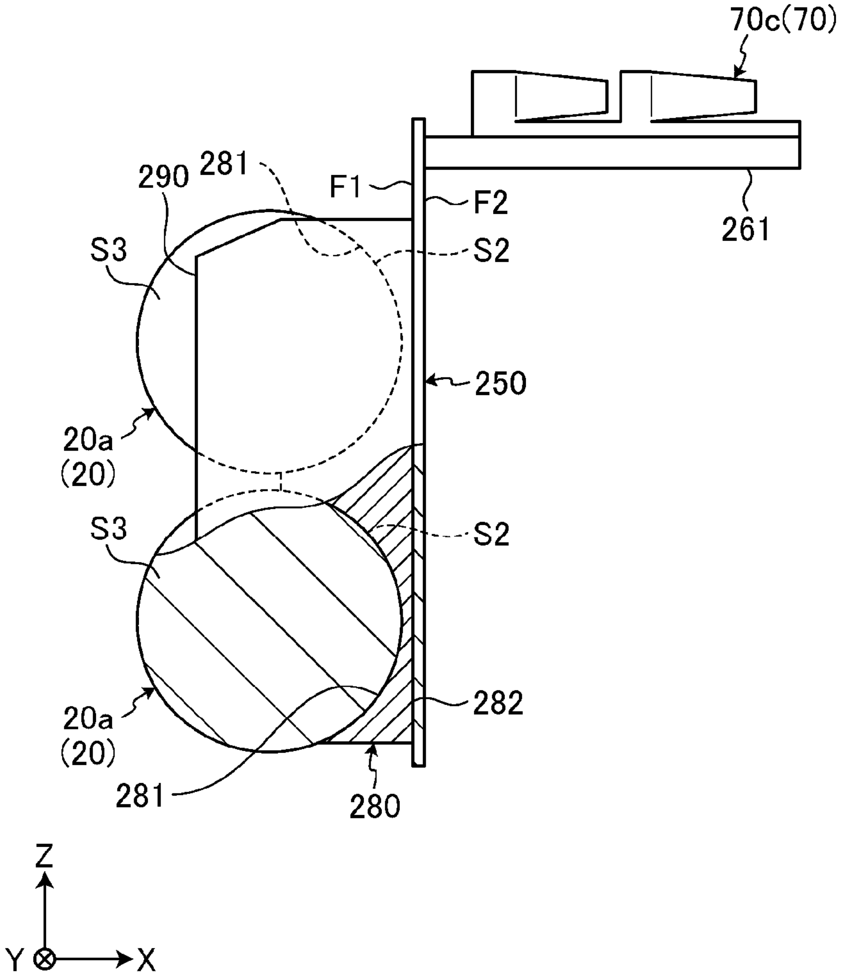
FIG. 15 is a front view of illustrating a part of a battery unit according to an embodiment of the present disclosure.
Figure 16:
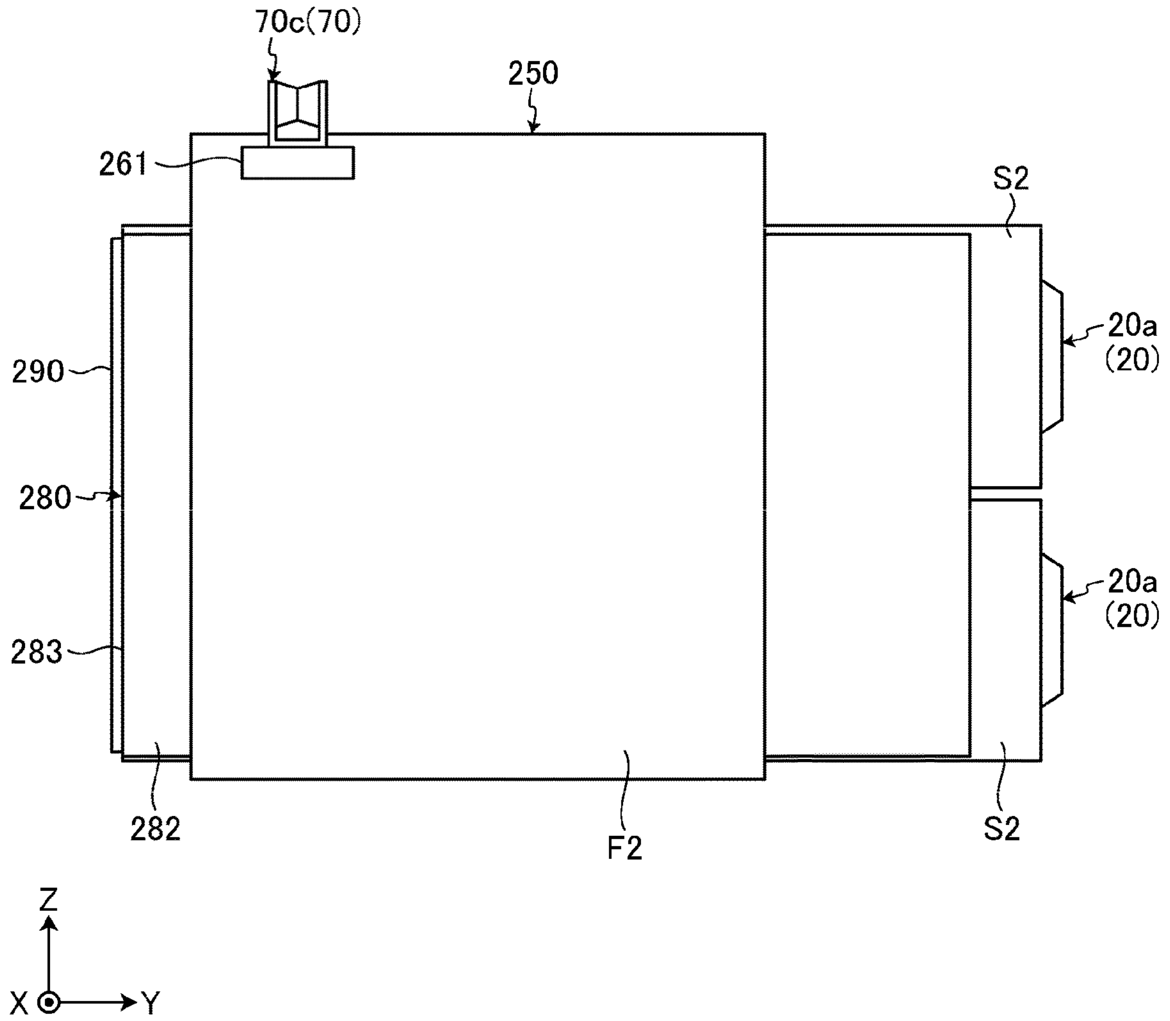
FIG. 16 is a side view of the part of the battery unit shown in FIG. 15.

FIG. 15 is a front view illustrating a part of the battery unit 12 according to the second embodiment of the present disclosure. FIG. 16 is a side view of a part of the battery unit 12 shown in FIG. 15. The battery unit 12 of the second embodiment does not include the second current collecting tab 40 of the first embodiment.

The battery unit 12 of the second embodiment further includes a thermal conductor 280 and a third current collecting tab 290. The thermal conductor 280 is thermally connected to the first secondary battery 20*a*. The thermal conductor 280 is a solid block having thermal conductivity. The thermal conductor 280 is supported by, for example, the holder H1.

The thermal conductor 280 has thermal conductivity. The thermal conductor 280 further has electrical conductivity. The material of the thermal conductor 280 has at least one metal element selected from the group consisting of copper, aluminum, iron, and nickel, and is, for example, a copper alloy.

The thermal conductor 280 has two curved surfaces 281, an opposite surface 282 opposite to the two curved surfaces 281, and a connection surface 283 connecting the two curved surfaces 281 and the opposite surface 282. It goes without saying that the number of curved surfaces 281 is not limited to two.

Curved surface 281 is in contact with outer peripheral surface S2 of first secondary battery 20*a* while being thermally connected to outer peripheral surface S2. Specifically, outer peripheral surface S2 of first secondary battery 20*a* and curved surface 281 are in contact with each other without being subjected to resistance welding, ultrasonic welding, or the like. Accordingly, thermal conductor 280 is thermally connected to outer peripheral surface S2 of first secondary battery 20*a*.

The third current collecting tab 290 electrically and thermally connects the first secondary battery 20*a* and the heat transfer member 250. Since the curved surface 281 and the outer peripheral surface S2 of the first secondary battery 20*a* are connected by contact without welding or the like, the electrical resistance is relatively large. When insulating film F is disposed on outer peripheral surface S2 of first secondary battery 20*a*, outer peripheral surface S2 of first secondary battery 20*a* and curved surface 281 are electrically insulated from each other. The third current collecting tab 290 eliminates the increase in electric resistance and the electrically insulated state. The third current collecting tab 290 has a plate shape, and has electrical conductivity and thermal conductivity. The material of the third current collecting tab 290 has at least one metal element selected from the group consisting of copper, aluminum, iron, and nickel, and is a copper alloy in the first embodiment.

The third current collecting tab 290 is electrically and thermally connected to each of the second end surface S3 of the first secondary battery 20*a* and the connection surface 283 of the thermal conductor 280 by resistance welding, ultrasonic welding, or the like. That is, the first secondary battery 20*a* and the thermal conductor 280 are electrically and thermally connected via the third current collecting tab 290.

Figure 17:
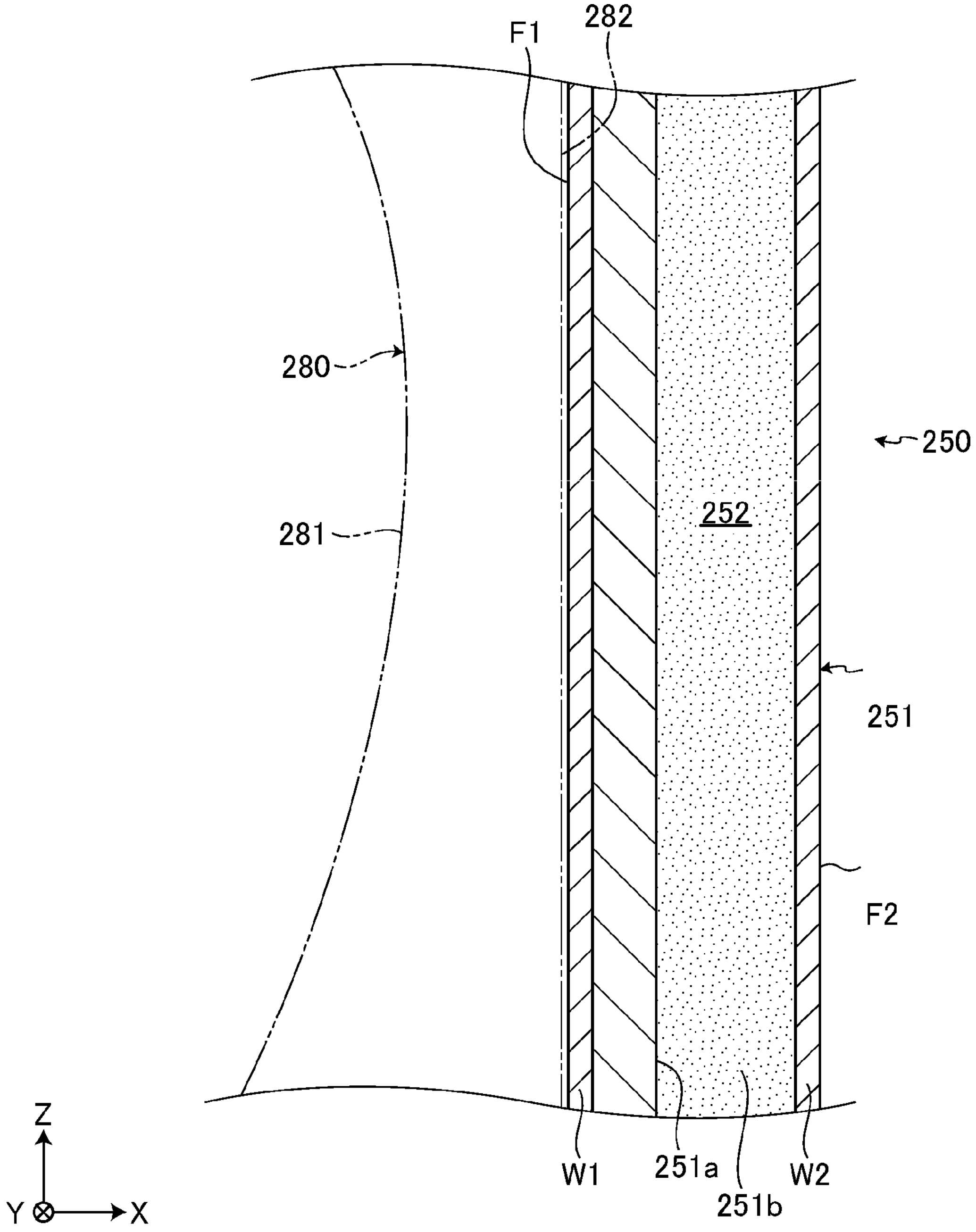
FIG. 17 is a sectional view of the heat transfer member shown in FIG. 15.

FIG. 17 is a sectional view of the heat transfer member 250 shown in FIG. 15. The heat transfer member 250 of the second embodiment is electrically and thermally connected to the first secondary battery 20*a* via the third current collecting tab 290 and the thermal conductor 280. The heat transfer member 250 is a so-called vapor chamber.

The heat transfer member 250 has a plate shape, and the first plate surface F1 of the heat transfer member 250 and the opposite surface 282 of the thermal conductor 280 are electrically and thermally connected. In the second embodiment, in a state where the first plate surface F1 of the heat transfer member 250 and the opposite surface 282 of the thermal conductor 280 are in close contact with each other, the peripheral edge of the portion where the heat transfer member 250 and the opposite surface 282 are in contact with each other is connected by, for example, laser welding or the like.

The case 251 of the heat transfer member 250 has a hollow plate shape. The wick portion 251*a* is disposed on the inner surface of the first side wall W1 having the first plate surface F1. The wick portion 251*a* is not disposed on the inner surface of the second side wall W2 facing the first side wall W1. The passage 251*b* is located between the second side wall W2 and the wick portion 251*a*. Similarly to the heat transfer member 50 of the first embodiment, the hydraulic fluid 252 circulates in the case 251, so that the heat transfer member 250 transfers the heat of the first secondary battery 20*a* to the conductor 261 described later.

The thickness of the heat transfer member 250 of the second embodiment is smaller than the diameter of the heat transfer member 250 of the first embodiment. As a result, the heat transfer member 250 of the second embodiment can be disposed between the plurality of secondary batteries 20 while suppressing an increase in size of the battery pack 1.

The contact area between the heat transfer member 250 and the thermal conductor 280 of the second embodiment is larger than the contact area between the heat transfer member 250 and the second current collecting tab 40 of the first embodiment. Further, the capacity of the case 251 of the second embodiment and the total amount of the hydraulic fluid 252 are larger than the capacity of the case 251 of the first embodiment and the total amount of the hydraulic fluid 52. Therefore, the amount of heat per unit time conducted by the heat transfer member 250 of the second embodiment is larger than the amount of heat per unit time conducted by the heat transfer member 250 of the first embodiment. Therefore, the heat transfer member 250 of the second embodiment efficiently transfers the heat of the first secondary battery 20*a* to the conductor 261.

As shown in FIGS. 15 and 16, the first plate surface F1 of the heat transfer member 250 and the second plate surface F2 of the heat transfer member 250 opposite to the first plate surface F1 are electrically and thermally connected to the negative electrode terminal 70*c* via the conductor 261 (for example, a bus bar) of the control board 60. That is, outer peripheral surface S2 of first secondary battery 20*a* is thermally connected to negative electrode terminal 70*c* via thermal conductor 280, heat transfer member 250, and conductor 261. The second end surface S3 of the first secondary battery 20*a* is electrically and thermally connected to the negative electrode terminal 70*c* via the third current collecting tab 290, the thermal conductor 280, the heat transfer member 250, and the conductor 261.

When an external device is connected to the external connection terminal 70, heat of the first secondary battery 20*a* is released from the external device to the outside via the third current collecting tab 290, the thermal conductor 280, the heat transfer member 250, the conductor 261, and the negative electrode terminal 70*c*.

For example, the thermal conductor 280 and the first secondary battery 20*a* may be electrically and thermally connected. In this case, curved surface 281 of thermal conductor 280 is uneven, and thermal conductor 280 is held by holder H1, for example, while curved surface 281 of thermal conductor 280 and outer peripheral surface S2 of first secondary battery 20*a* are pressed against each other. In this case, electric resistance between curved surface 281 of thermal conductor 280 and outer peripheral surface S2 of first secondary battery 20*a* can be reduced, and curved surface 281 of thermal conductor 280 and outer peripheral surface S2 of first secondary battery 20*a* are electrically and thermally connected. In this case, outer peripheral surface S2 of first secondary battery 20*a* is electrically and thermally connected to negative electrode terminal 70*c* via thermal conductor 280, heat transfer member 250, and conductor 261.

Further, thermal conductor 280 and outer peripheral surface S2 of first secondary battery 20*a* may be electrically and thermally connected by laser welding a peripheral edge of a portion where thermal conductor 280 and outer peripheral surface S2 of first secondary battery 20*a* are in contact with each other.

Thermal conductor 280 may be further electrically and thermally connected to second end surface S3 of first secondary battery 20*a*. The third current collecting tab 290 may be further electrically and thermally connected to the outer peripheral surface S2 of the first secondary battery 20*a*. In this case, the outer peripheral surface S2 and the second end surface S3 of the first secondary battery 20*a* are electrically and thermally connected to the negative electrode terminal 70*c* via the third current collecting tab 290, the thermal conductor 280, the heat transfer member 250, and the conductor 261.

In addition, the thermal conductor 280 may be a hollow block or may have a plate shape. Also in this case, similarly to the case where the thermal conductor 280 is a solid block as described above, the thermal conductor 280 has electrical conductivity and thermal conductivity, and transfers the heat of the first secondary battery 20*a* to the heat transfer member 250.

Next, a difference of a battery pack 1 according to a third embodiment of the present disclosure from the battery pack 1 according to the first embodiment will be mainly described.

Figure 18:
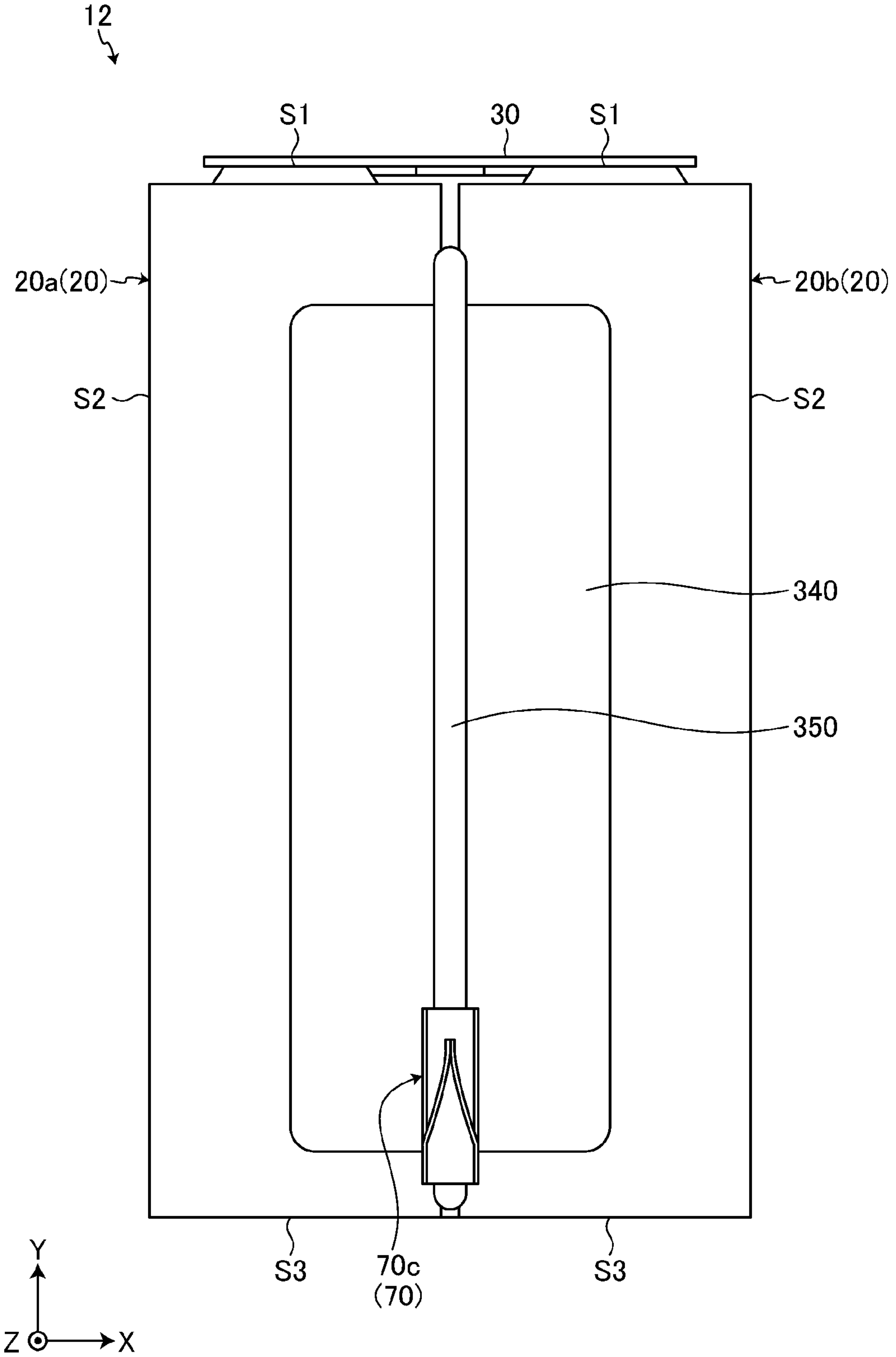
FIG. 18 is a top view of a battery unit according to an embodiment of the present disclosure.
Figure 19:
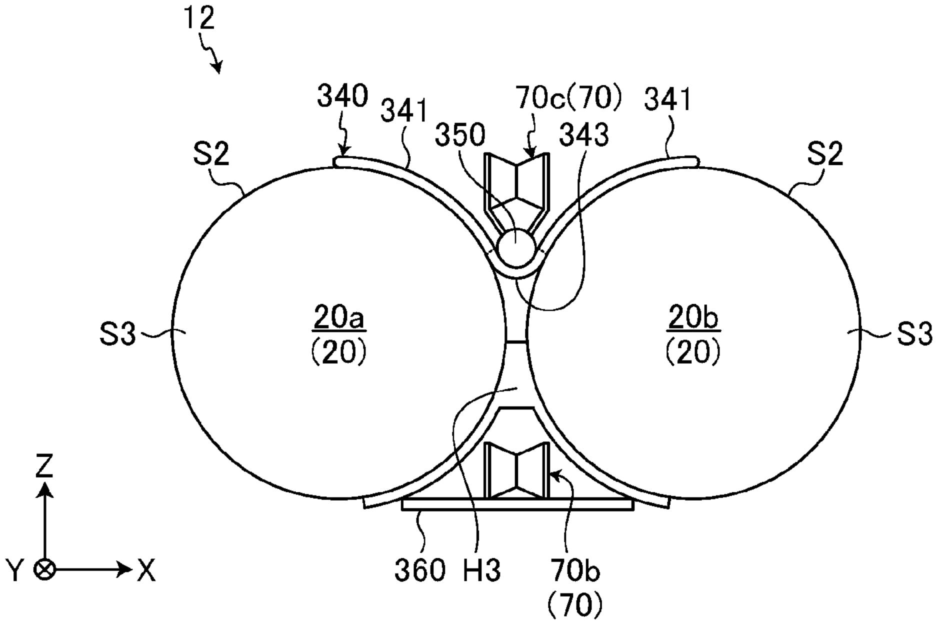
FIG. 19 is a front view of the battery unit shown in FIG. 18.
Figure 20:
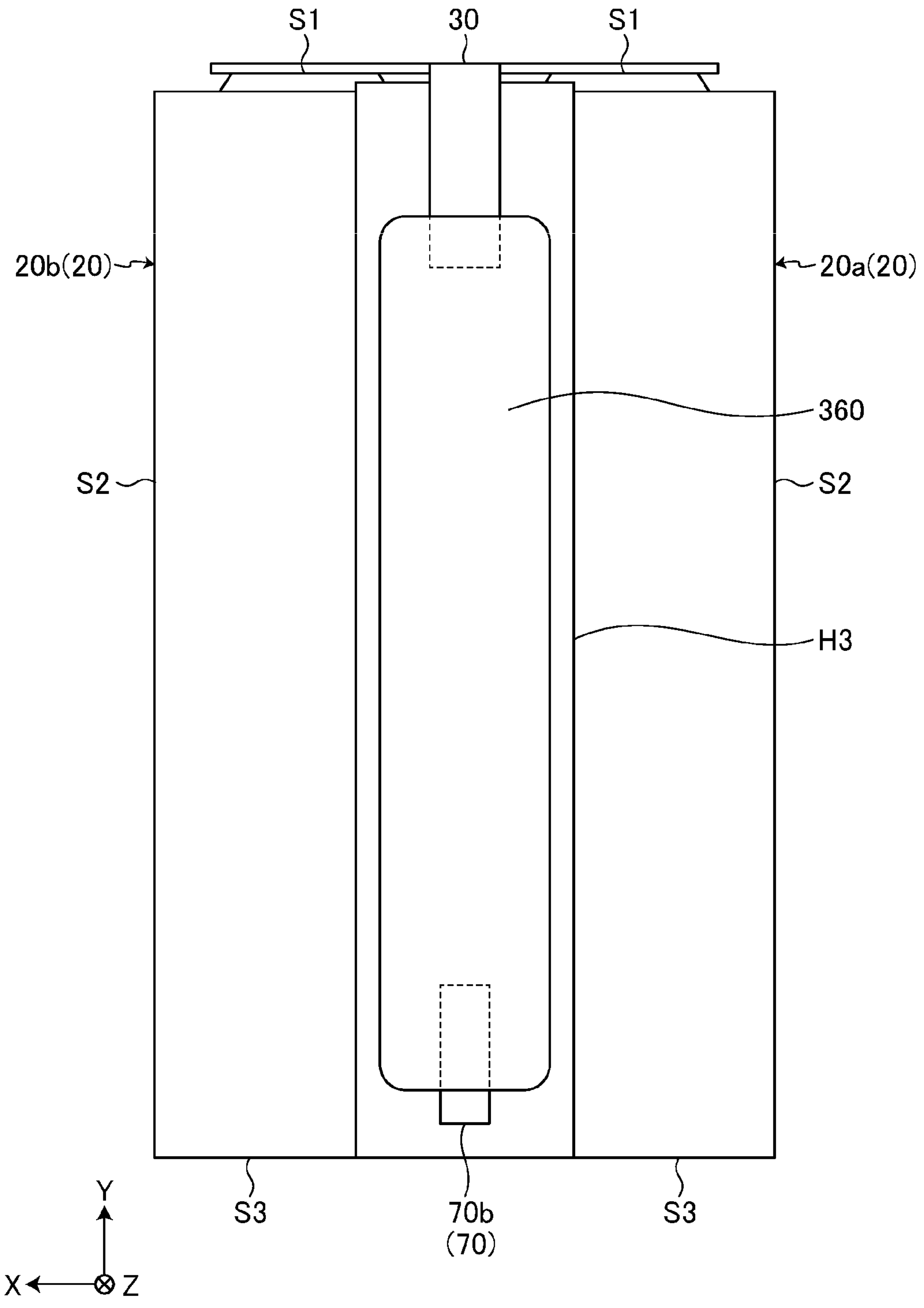
FIG. 20 is a bottom view of the battery unit shown in FIG. 18.

FIG. 18 is a top view of a battery unit 12 according to a third embodiment of the present disclosure. FIG. 19 is a front view of the battery unit 12 shown in FIG. 18. FIG. 20 is a bottom view of the battery unit 12 shown in FIG. 18.

As compared with the first embodiment, in the third embodiment, the number of secondary batteries 20 is two. As shown in FIGS. 18, 19, and 20, the battery unit 12 of the third embodiment includes the first secondary battery 20*a* and the second secondary battery 20*b*. The holder H3 (see FIGS. 19 and 20) holds a control board 360, the first secondary battery 20*a*, and the second secondary battery 20*b*.

A portion on the −X side of the outer peripheral surface S2 of the first secondary battery 20*a* and a portion on the +X side of the outer peripheral surface S2 of the second secondary battery 20*b* are in contact with the inner surface of the exterior case 11. On the other hand, a portion on the +X side of outer peripheral surface S2 of first secondary battery 20*a* and a portion on the −X side of outer peripheral surface S2 of second secondary battery 20*b* face each other in the X direction, and are not in contact with the inner surface of exterior case 11. Therefore, the heat of the first secondary battery 20*a* and the second secondary battery 20*b* is hardly released from the portions of the outer peripheral surface S2 facing each other in the first secondary battery 20*a* and the second secondary battery 20*b*.

The first secondary battery 20*a* and the second secondary battery 20*b* are electrically connected in parallel. Specifically, the first end surface S1 of the first secondary battery 20*a* and the first end surface S1 of the second secondary battery 20*b* are electrically and thermally connected to the first current collecting tab 30. The first current collecting tab 30 is electrically and thermally connected to the positive electrode terminal 70*b* via the control board 360 (see FIG. 20). Therefore, the heat of the secondary battery 20 is transmitted from the first end surface S1 to the positive electrode terminal 70*b* via the first current collecting tab 30 and the control board 360.

Further, outer peripheral surface S2 of first secondary battery 20*a* and outer peripheral surface S2 of second secondary battery 20*b* are electrically and thermally connected to negative electrode terminal 70*c* via the second current collecting tab 340 and the heat transfer member 350.

The second current collecting tab 340 of the third embodiment integrally includes two curved portions 341 and a second curved portion 343 (see FIG. 19). The second curved portion 343 extends along the Y direction, and a sectional shape of the second curved portion 343 when cut along a plane orthogonal to the Y direction is a concave shape recessed toward the −Z side.

The two curved portions 341 are disposed continuously from the second curved portion 343 on both sides of the second curved portion 343 in the X direction. The two curved portions 341 are electrically and thermally connected to portions facing each other on the outer peripheral surface S2 of the first secondary battery 20*a* and the outer peripheral surface S2 of the second secondary battery 20*b*. Specifically, one curved portion 341 is electrically and thermally connected to a portion on the +X side and the +Z side on the outer peripheral surface S2 of the first secondary battery 20*a*, and the other curved portion 341 is electrically and thermally connected to a portion on the −X side and the +Z side on the outer peripheral surface S2 of the second secondary battery 20*b*. It is needless to say that the portion of the outer peripheral surface S2 of the secondary battery 20 to which the two curved portions 341 are electrically and thermally connected may include a part of the portion facing each other on the outer peripheral surface S2 of the first secondary battery 20*a* and the outer peripheral surface S2 of the second secondary battery 20*b*, and is not limited to the above portion.

The heat transfer member 350 of the third embodiment extends straight along the Y direction (see FIG. 18). The heat transfer member 350 is a heat pipe similarly to the first embodiment. The heat transfer member 350 is disposed on the +Z-side surface of the second curved portion 343 over the entire Y direction, and is electrically and thermally connected to the second current collecting tab 340 by resistance welding, ultrasonic welding, or the like. The negative electrode terminal 70*c* is electrically and thermally connected to the −Y-side end of the heat transfer member 350 by resistance welding, ultrasonic welding, or the like.

As a result, the heat of the secondary battery 20 is transferred to the negative electrode terminal 70*c* via the second current collecting tab 340 and the heat transfer member 350. Therefore, similarly to the first embodiment, the heat of the secondary battery 20 is transmitted from the positive electrode terminal 70*b* and the negative electrode terminal 70*c* to an external device, and is released from the external device to the outside. In the third embodiment, the second current collecting tab 340 is disposed at a portion of the outer peripheral surface S2 facing each other in the first secondary battery 20*a* and the second secondary battery 20*b*, and the heat of the secondary battery 20 is efficiently transmitted to the negative electrode terminal 70*c*. Therefore, the heat dissipation performance of the battery pack 1 can be improved.

In the third embodiment, the first secondary battery 20*a* and the second secondary battery 20*b* may be electrically connected in series. In this case, the second current collecting tab 340 has only one curved portion 341, and the curved portion 341 is electrically and thermally connected to only the outer peripheral surface S2 of the first secondary battery 20*a*. In this case, the battery pack 1 has two first current collecting tabs 30, one first current collecting tab 30 electrically and thermally connects the first end surface S1 of the first secondary battery 20*a* and the second end surface S3 of the second secondary battery 20*b*, and the other first current collecting tab 30 electrically and thermally connects the first end surface S1 of the second secondary battery 20*b* and the positive electrode terminal 70*b*. Also in this case, the heat of the secondary battery 20 is transmitted to an external device via the second current collecting tab 340, the heat transfer member 350, and the negative electrode terminal 70*c*, and is released from the external device to the outside. Therefore, the heat dissipation performance of the battery pack 1 can be improved.

Note that the above-described exemplary embodiments and modifications are for facilitating understanding of the present disclosure, and are not intended to limit and interpret the present disclosure. The present disclosure may be modified/improved without departing from the spirit thereof, and the present disclosure includes equivalents thereof.

Note that the present disclosure may be a combination of the following configurations according to an embodiment.

(1) A battery pack including:

a first secondary battery and a second secondary battery each having a cylindrical shape and arranged in parallel;

an external connection terminal detachably electrically and thermally connected to an external device; and a heat transfer member that electrically and thermally connects the first secondary battery and the external connection terminal.

(2) The battery pack according to (1), further including a third secondary battery having a cylindrical shape and arranged in parallel with the first secondary battery and the second secondary battery, wherein the first secondary battery is disposed between the second secondary battery and the third secondary battery.

(3) The battery pack according to (1) or (2), further including a first current collecting tab electrically and thermally connecting the first secondary battery and the second secondary battery, wherein a thermal conductivity of the heat transfer member is higher than the thermal conductivity of the first current collecting tab.

(4) The battery pack according to any one of (1) to (3), further including a second current collecting tab electrically and thermally connected to an outer peripheral surface of the first secondary battery, wherein the heat transfer member is electrically and thermally connected to the first secondary battery via the second current collecting tab.

(5) The battery pack according to (4), wherein the second current collecting tab is further electrically and thermally connected to an end surface of the first secondary battery.

(6) The battery pack according to (4) or (5), wherein the second current collecting tab contains at least one metal element selected from the group consisting of copper, aluminum, iron, and nickel.

(7) The battery pack according to any one of (1) to (3), further including:

a thermal conductor thermally connected to the first secondary battery; and a third current collecting tab electrically and thermally connected to the first secondary battery, wherein the heat transfer member is electrically and thermally connected to the first secondary battery via the third current collecting tab and the thermal conductor.

(8) The battery pack according to (7), wherein the thermal conductor is thermally connected to an outer peripheral surface of the first secondary battery.

(9) The battery pack according to (7) or (8), wherein the third current collecting tab is electrically and thermally connected to an end surface of the first secondary battery.

(10) The battery pack according to any one of (7) to (9), wherein the thermal conductor contains at least one metal selected from the group consisting of copper, aluminum, iron, and nickel.

(11) The battery pack according to any one of (1) to (10), further including a control board on which the external connection terminal is disposed, wherein the control board has a slit through which the heat transfer member passes.

(12) The battery pack according to any one of (1) to (10), further including:

a first control board on which the external connection terminal is disposed; and a second control board disposed apart from the first control board, wherein the heat transfer member passes between the first control board and the second control board.

(13) The battery pack according to any one of (1) to (12), wherein the heat transfer member includes a case having electrical conductivity and thermal conductivity, and a hydraulic fluid stored in the case, and an inner portion of the case includes a wick portion having a capillary structure.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A battery pack comprising:

a first secondary battery and a second secondary battery each having a cylindrical shape and arranged such that respective central axes of the first secondary battery and the second secondary battery extend substantially in parallel with each other;

an external connection terminal detachably electrically and thermally connected to an external device; and a heat transfer member that electrically and thermally connects the first secondary battery and the external connection terminal, wherein the heat transfer member includes a case having electrical conductivity and thermal conductivity, and a hydraulic fluid stored in the case, and an inner portion of the case includes a wick portion having a capillary structure.

2. The battery pack according to claim 1, further comprising a third secondary battery having a cylindrical shape and arranged such that a central axis of the third secondary battery extends substantially in parallel with the respective central axes of the first secondary battery and the second secondary battery, wherein the first secondary battery is disposed between the second secondary battery and the third secondary battery.

3. The battery pack according to claim 1, further comprising a first current collecting tab electrically and thermally connecting the first secondary battery and the second secondary battery, wherein the thermal conductivity of the heat transfer member is higher than a thermal conductivity of the first current collecting tab.

4. The battery pack according to claim 1, further comprising a second current collecting tab electrically and thermally connected to an outer peripheral surface of the first secondary battery, wherein the heat transfer member is electrically and thermally connected to the first secondary battery via the second current collecting tab.

5. The battery pack according to claim 4, wherein the second current collecting tab is further electrically and thermally connected to an end surface of the first secondary battery.

6. The battery pack according to claim 4, wherein the second current collecting tab contains at least one metal selected from the group consisting of copper, aluminum, iron, and nickel.

7. The battery pack according to claim 1, further comprising:

a thermal conductor thermally connected to the first secondary battery; and a third current collecting tab electrically and thermally connected to the first secondary battery, wherein the heat transfer member is electrically and thermally connected to the first secondary battery via the third current collecting tab and the thermal conductor.

8. The battery pack according to claim 7, wherein the thermal conductor is thermally connected to an outer peripheral surface of the first secondary battery.

9. The battery pack according to claim 7, wherein the third current collecting tab is electrically and thermally connected to an end surface of the first secondary battery.

10. The battery pack according to claim 7, wherein the thermal conductor contains at least one metal selected from the group consisting of copper, aluminum, iron, and nickel.

11. The battery pack according to claim 1, further comprising a control board on which the external connection terminal is disposed, wherein the control board has a slit through which the heat transfer member passes.

12. The battery pack according to claim 1, further comprising:

a first control board on which the external connection terminal is disposed; and a second control board disposed apart from the first control board, wherein the heat transfer member passes between the first control board and the second control board.

* * * * *